(12) United States Patent
So et al.

(10) Patent No.: US 11,147,424 B2
(45) Date of Patent: Oct. 19, 2021

(54) CLEANING ROBOT AND CONTROLLING METHOD THEREFOR

(71) Applicant: Samsung Electronics Co., Ltd., Suwon-si (KR)

(72) Inventors: Jea Yun So, Suwon-si (KR); Yeon Kyu Jeong, Suwon-si (KR); Sang Sik Yoon, Yongin-si (KR); Shin Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 332 days.

(21) Appl. No.: 15/760,162

(22) PCT Filed: Sep. 13, 2016

(86) PCT No.: PCT/KR2016/010327
§ 371 (c)(1),
(2) Date: Mar. 14, 2018

(87) PCT Pub. No.: WO2017/048046
PCT Pub. Date: Mar. 23, 2017

(65) Prior Publication Data
US 2018/0255997 A1    Sep. 13, 2018

(30) Foreign Application Priority Data
Sep. 17, 2015 (KR) ........................ 10-2015-0131497

(51) Int. Cl.
*A47L 9/28* (2006.01)
*A47L 9/04* (2006.01)
(Continued)

(52) U.S. Cl.
CPC .......... *A47L 9/2842* (2013.01); *A47L 9/0461* (2013.01); *A47L 9/28* (2013.01); *A47L 9/2826* (2013.01);
(Continued)

(58) Field of Classification Search
None
See application file for complete search history.

(56) References Cited

U.S. PATENT DOCUMENTS

| 5,276,939 A  | * | 1/1994 | Uenishi | ................. A47L 9/2857 |
|  |  |  |  | 15/319 |
| 6,605,156 B1 | * | 8/2003 | Clark   | ........................ A47L 5/30 |
|  |  |  |  | 134/18 |

(Continued)

FOREIGN PATENT DOCUMENTS

| KR | 10-2009-0119638 A | 11/2009 |
| KR | 10-0962593 B1 | 6/2010 |

(Continued)

OTHER PUBLICATIONS

Supplementary European Search Report dated Jun. 8, 2018 in connection with European Patent Application No. 16 84 6867.

(Continued)

*Primary Examiner* — Brian D Keller

(57) ABSTRACT

A robot cleaner and a method for controlling the same are disclosed, which perform efficient cleaning by controlling a suction force or traveling route of the robot cleaner. The robot cleaner detects load applied to wheels of the robot cleaner so as to increase reliability and accuracy in floor state decision, thereby recognizing a floor state. The robot cleaner recognizes a floor state by combining load applied to wheels of the robot cleaner, load applied to brushes, and acceleration information of the robot cleaner with one another in a complementary manner, thereby increasing accuracy in floor state decision. The robot cleaner includes a traveling portion configured to include a traveling wheel to move a main body, and a wheel motor to provide the traveling wheel with drive power, a cleaning portion configured to include a brush module formed at a lower part of the main body to scatter dust or foreign substances accu- (Continued)

mulated on a floor on which the main body travels, and a suction module to suction the scattered dust or foreign substances, and a controller configured to determine a state of the floor, and control a suction force of the suction module and a traveling route of the main body according to the determined floor state.

28 Claims, 36 Drawing Sheets

(51) Int. Cl.
    *A47L 9/30*     (2006.01)
    *G05D 1/02*     (2020.01)
    *B25J 11/00*     (2006.01)
    *B25J 9/16*     (2006.01)
    *B25J 9/00*     (2006.01)

(52) U.S. Cl.
    CPC ............ *A47L 9/2852* (2013.01); *A47L 9/30* (2013.01); *B25J 9/00* (2013.01); *B25J 9/16* (2013.01); *B25J 9/1664* (2013.01); *B25J 11/00* (2013.01); *B25J 11/0085* (2013.01); *G05D 1/02* (2013.01); *G05D 1/0219* (2013.01); *A47L 2201/04* (2013.01); *A47L 2201/06* (2013.01); *G05D 2201/0203* (2013.01); *Y10S 901/01* (2013.01)

(56) References Cited

U.S. PATENT DOCUMENTS

2010/0313910 A1* 12/2010 Lee ................ A47L 7/02
                                        134/6
2013/0054022 A1* 2/2013 Jang ................ A47L 9/2805
                                       700/245

FOREIGN PATENT DOCUMENTS

| KR | 10-2010-0133870 A | 12/2010 |
| KR | 10-2012-0055891 A | 6/2012 |
| KR | 10-2014-0011216 A | 1/2014 |
| KR | 10-2014-0066850 A | 6/2014 |

OTHER PUBLICATIONS

ISA/KR, International Search Report and Written Opinion of the International Searching Authority, International Application No. PCT/KR2016/010327, dated Dec. 29, 2016, 12 pages.

Non-Final Office Action dated Sep. 4, 2020 in connection with U.S. Appl. No. 16/749,788, 10 pages.

Notification of Reason for Refusal dated Nov. 24, 2020 in connection with Korean Application No. 10-2015-0131497, 15 pages.

Notice of Preliminary Rejection dated May 24, 2021 in connection with Korean Application No. 10-2015-0131497, 6 pages.

Notice of Patent Allowance dated Jul. 16, 2021 in connection with Korean Application No. 10-2015-0131497, 4 pages.

\* cited by examiner

[Fig. 1]
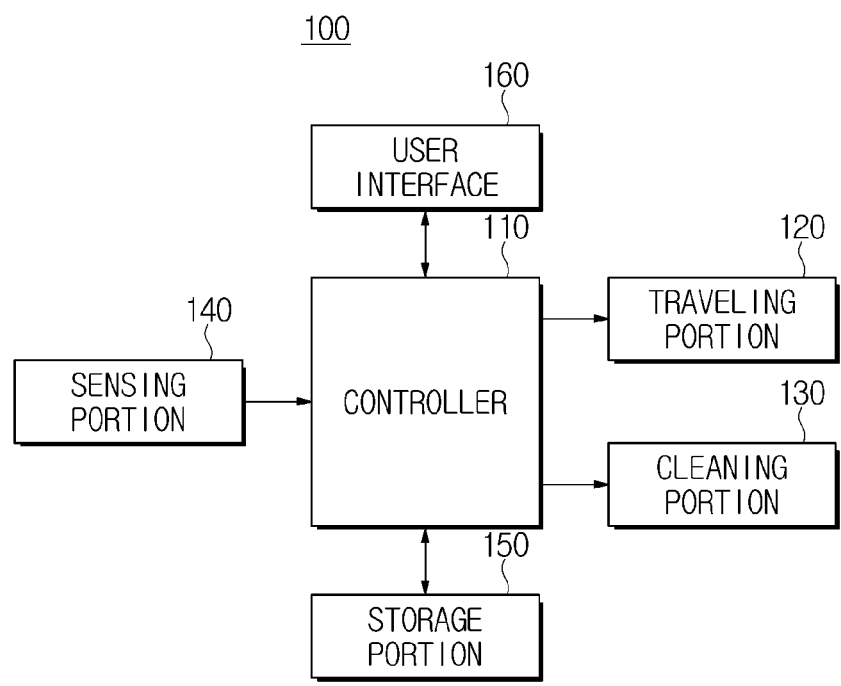

[Fig. 2]
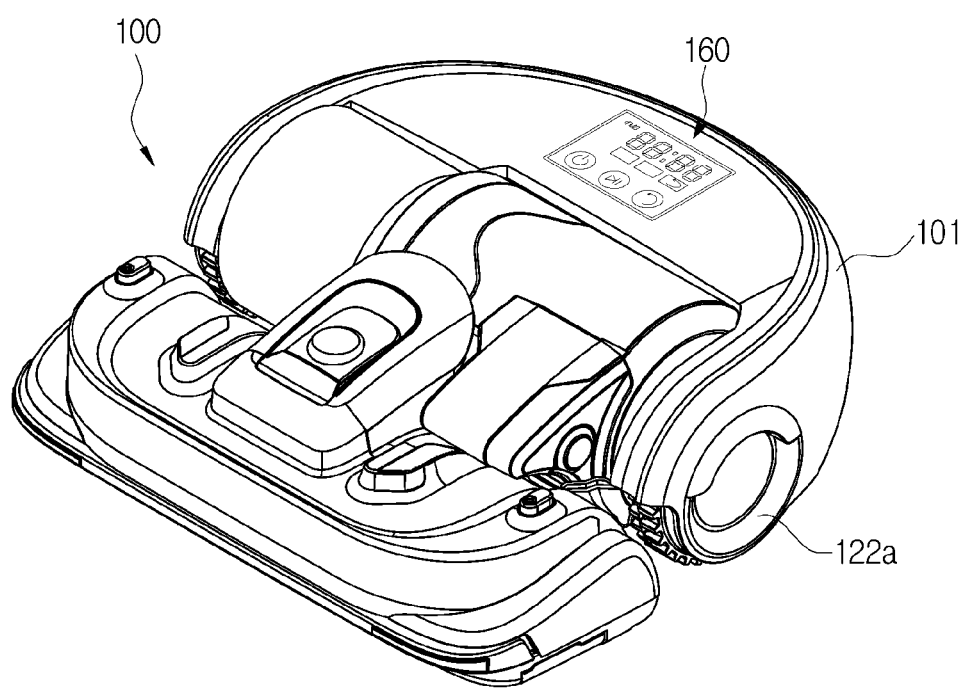

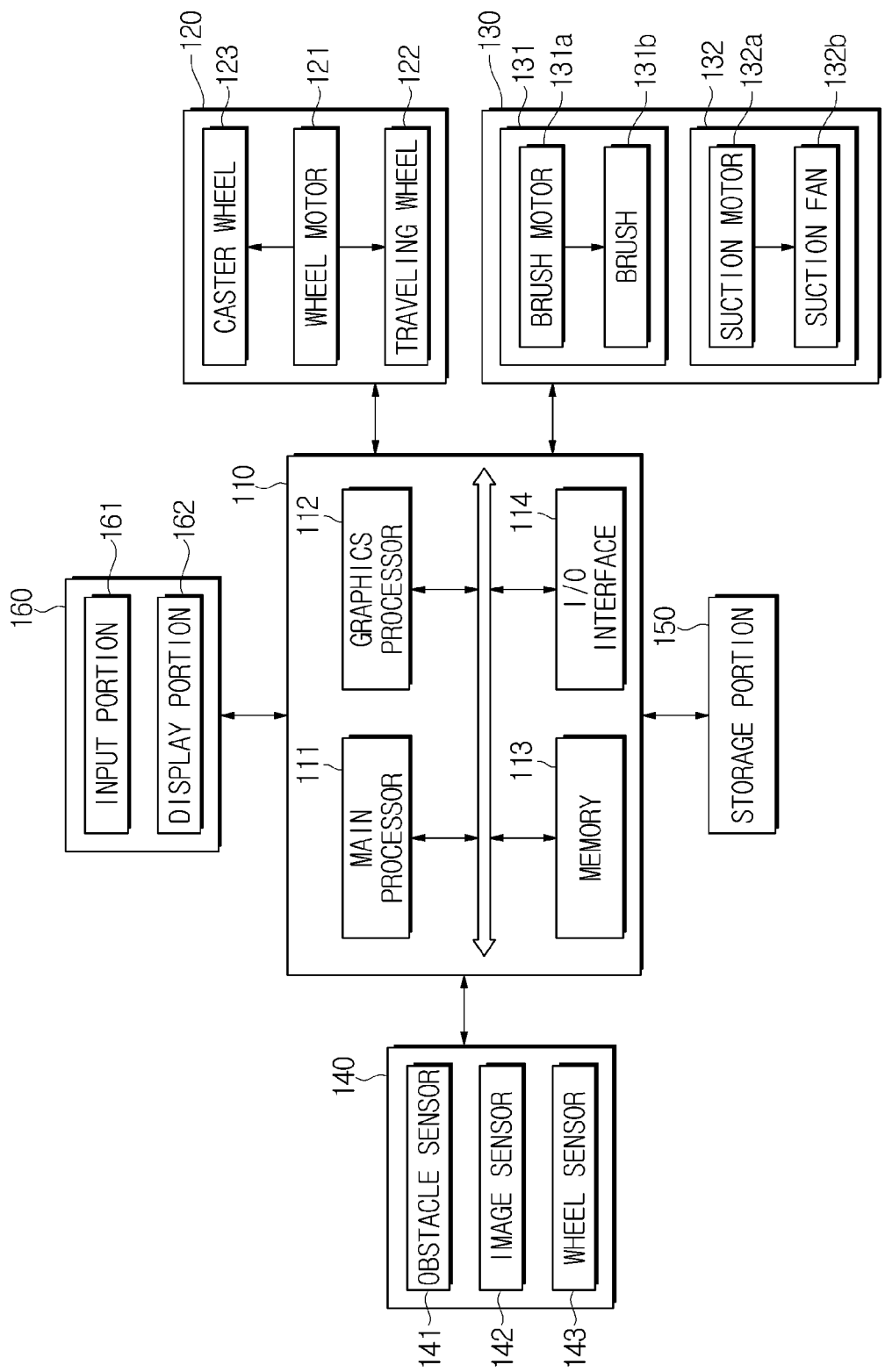

[Fig. 4]
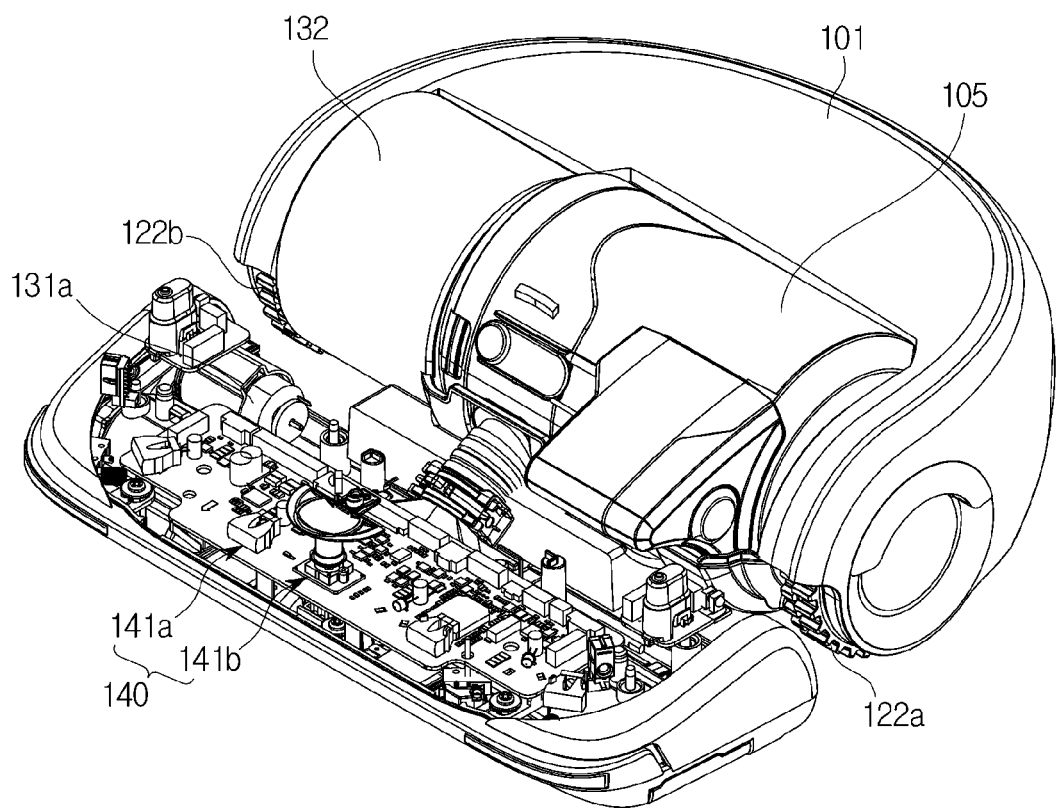

[Fig. 5]
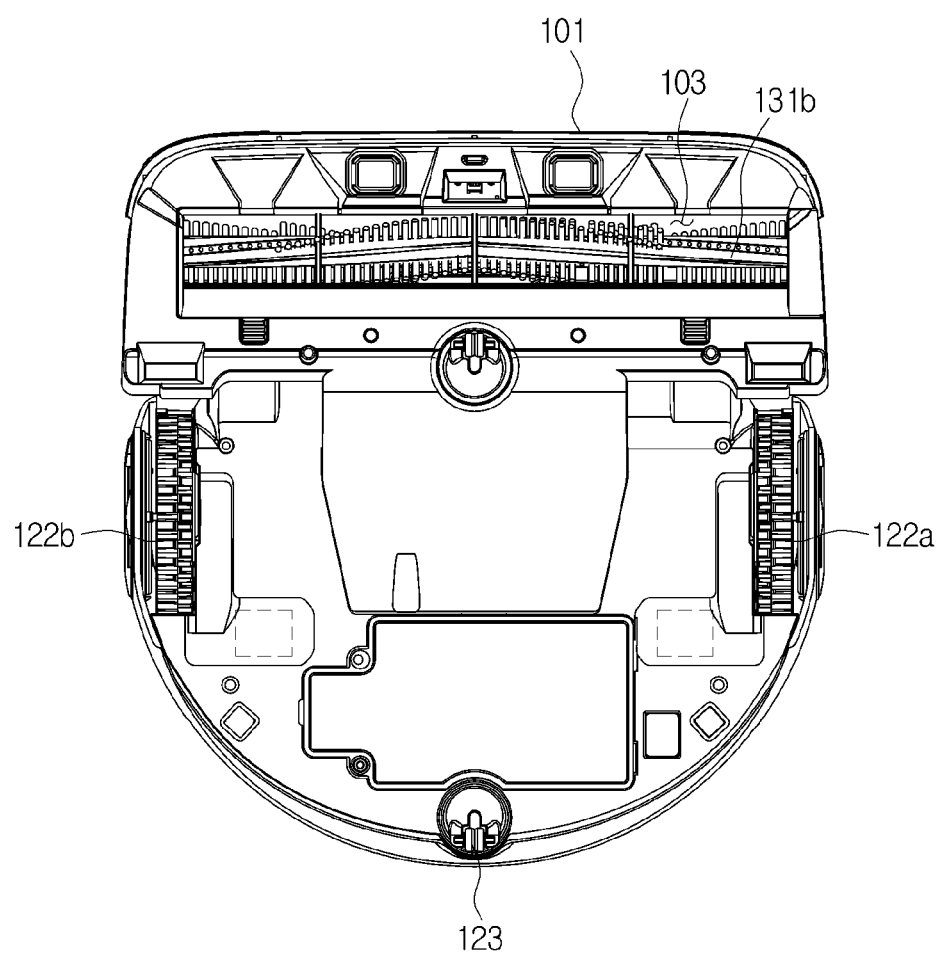

[Fig. 6]
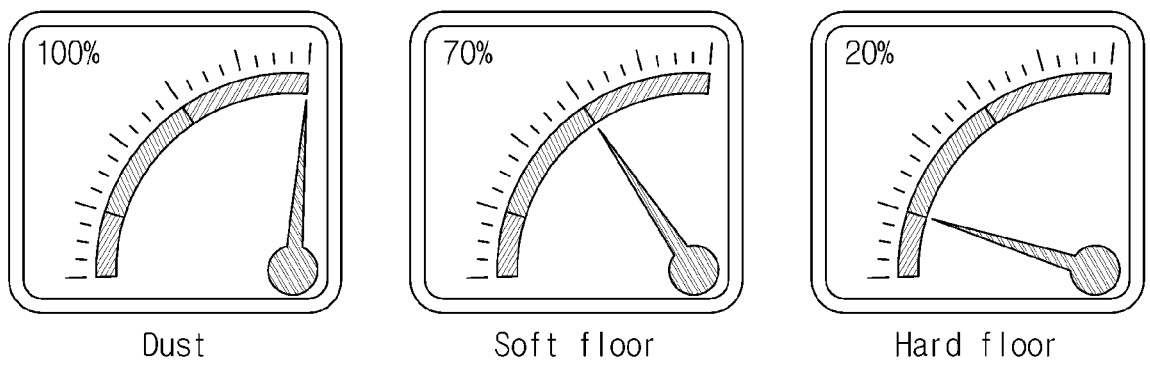

[Fig. 7]
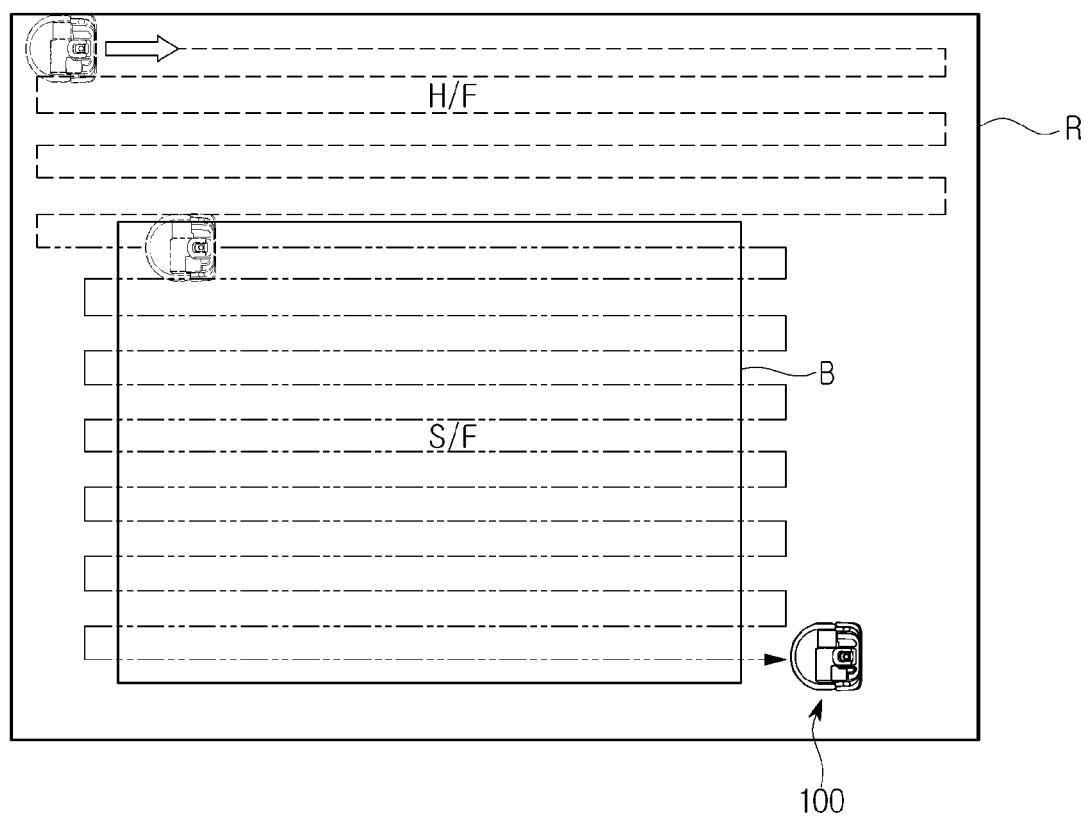

[Fig. 8]
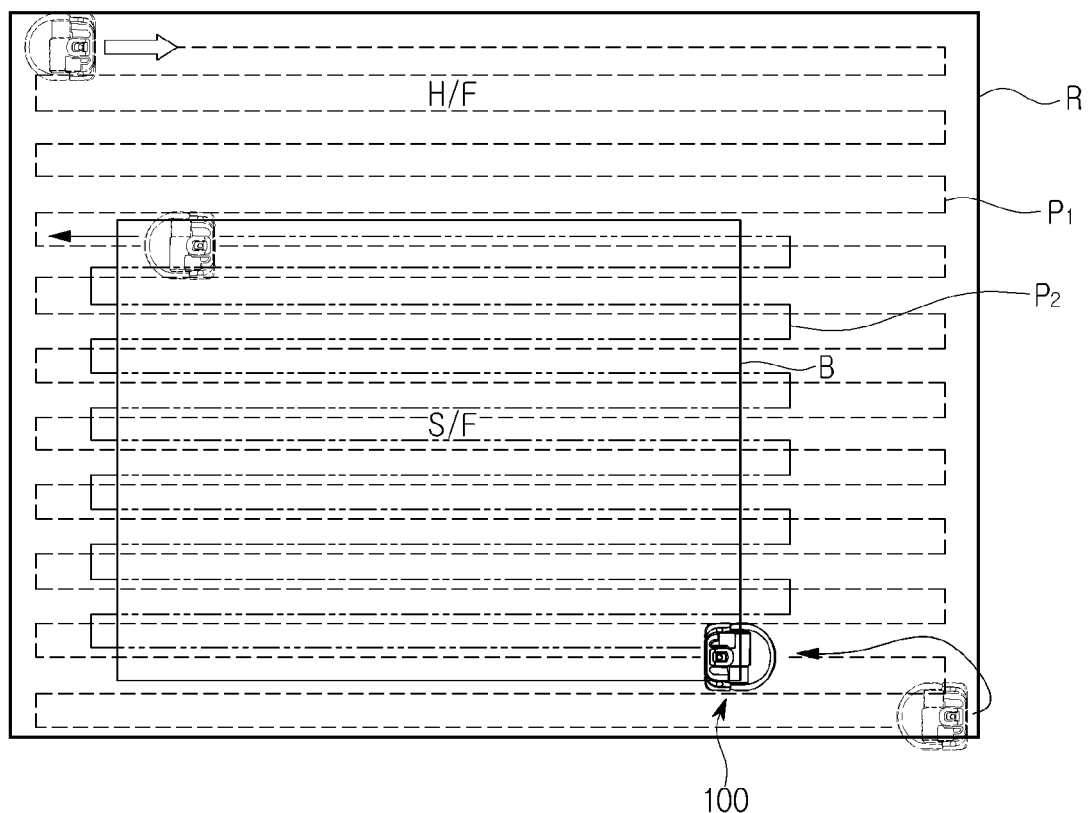

[Fig. 9]
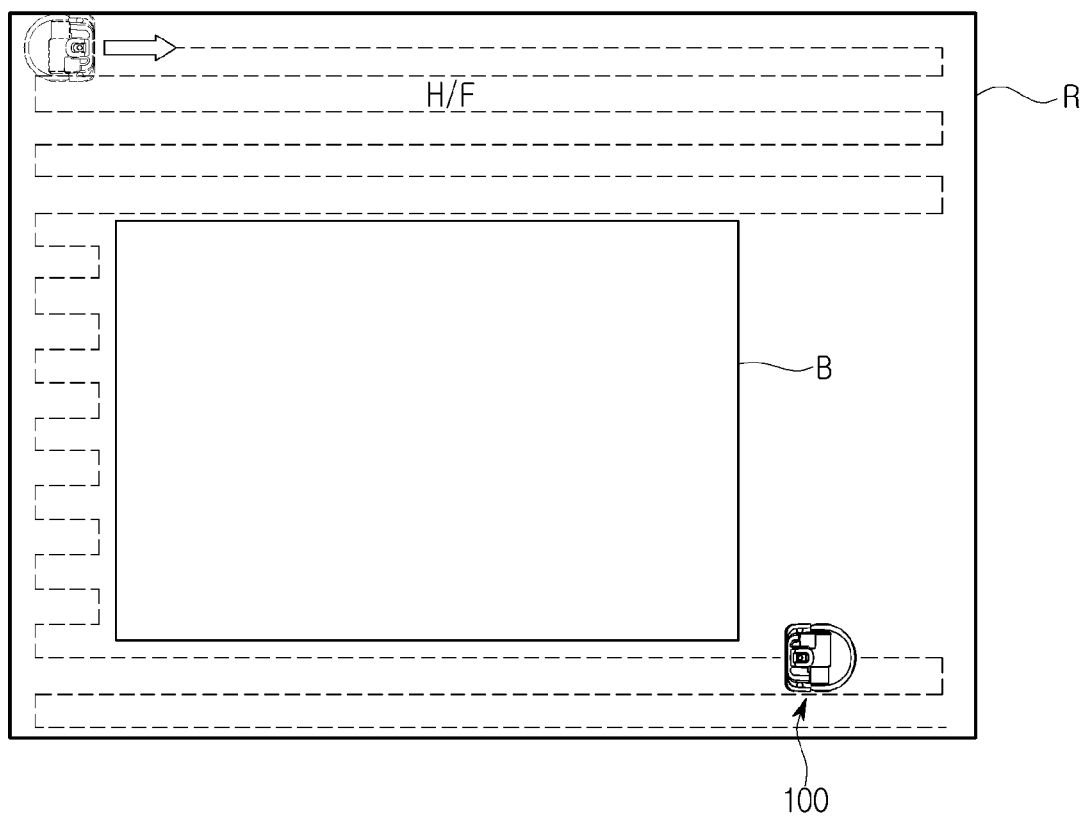

[Fig. 10]
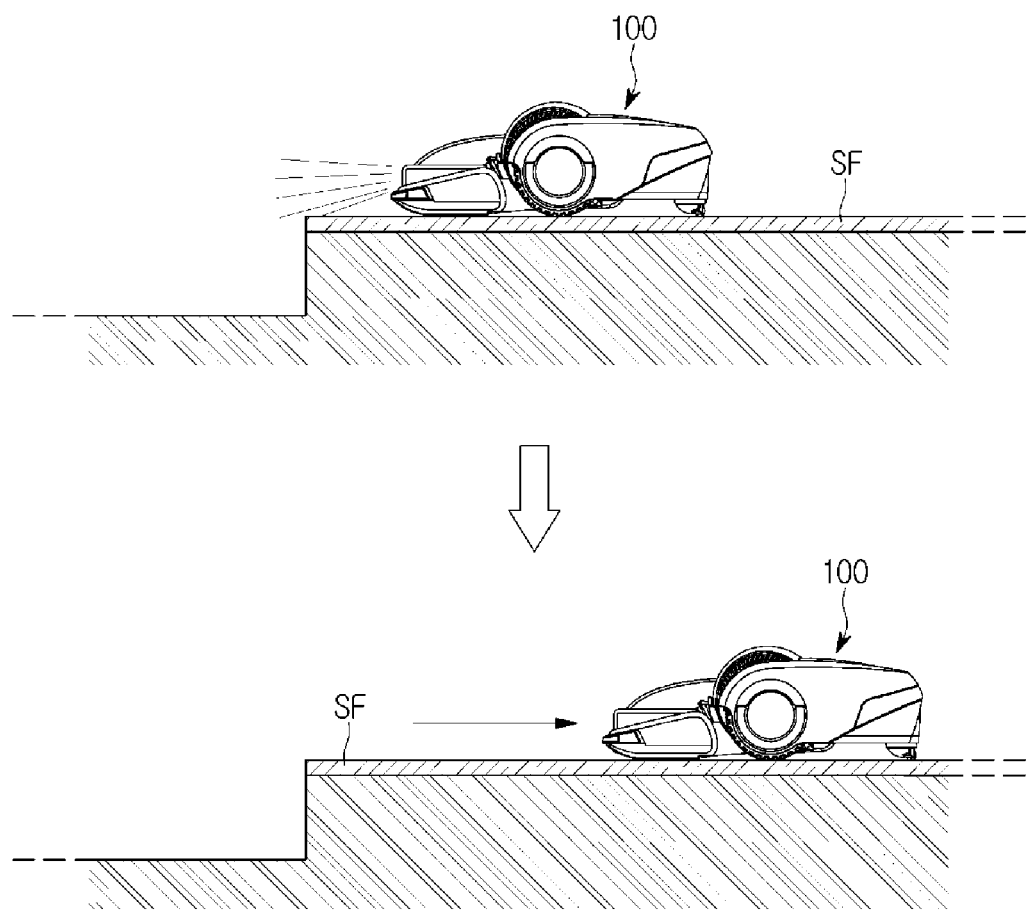

【Fig. 11】
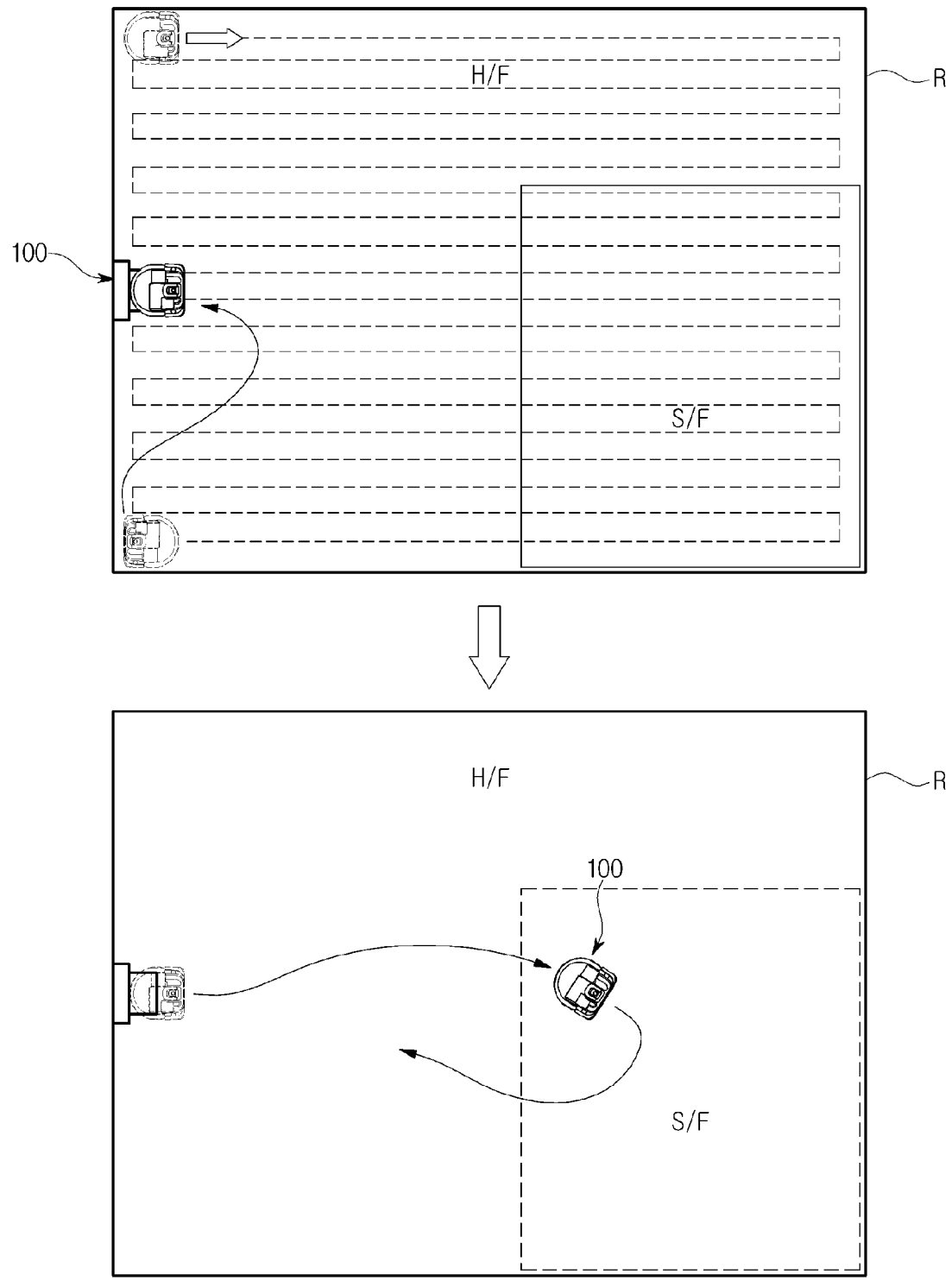

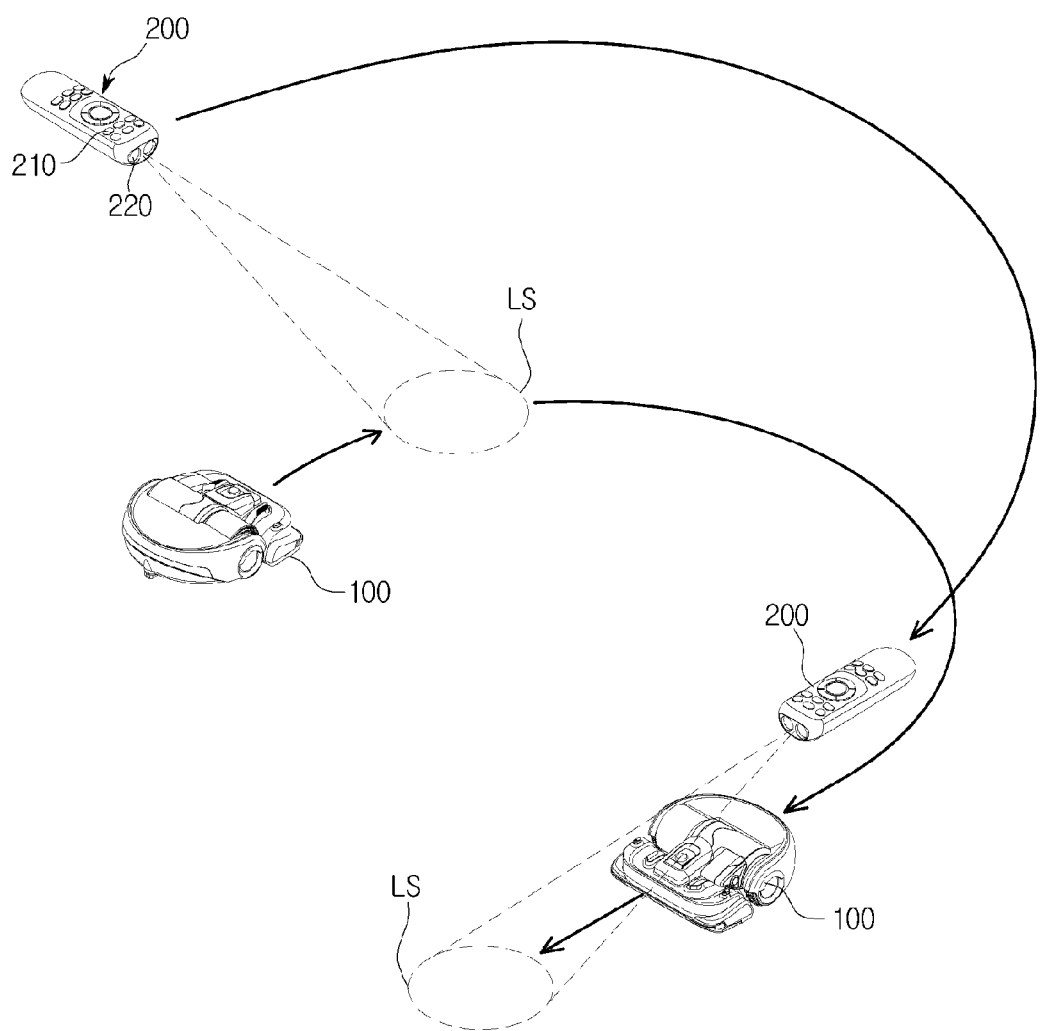
[Fig. 12]

[Fig. 13]
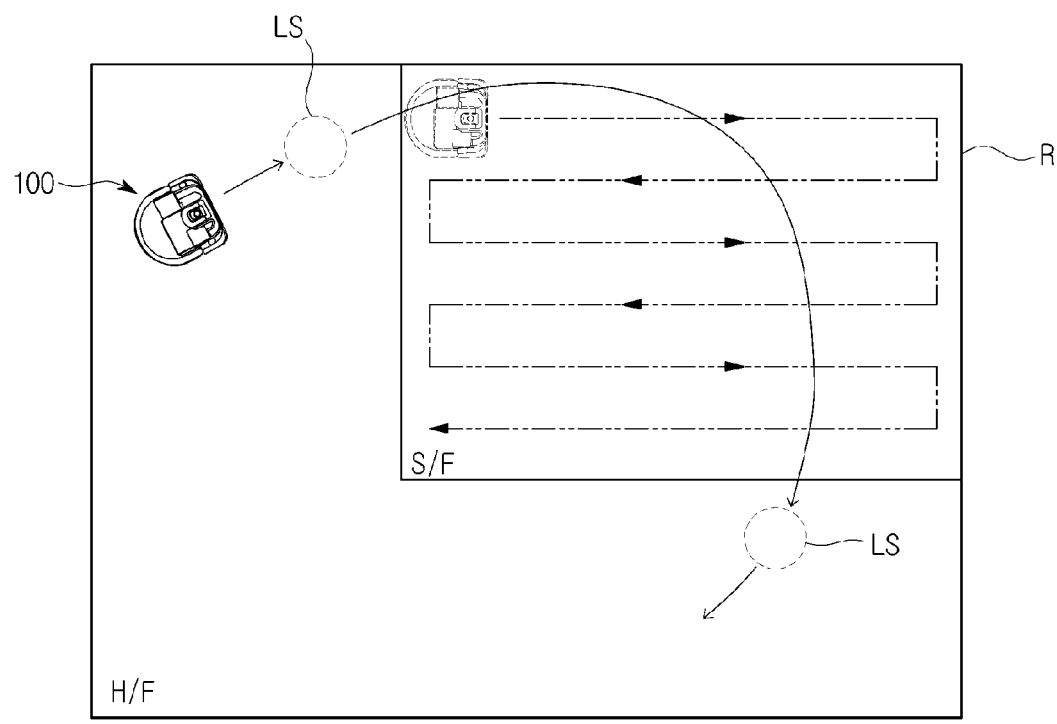

[Fig. 14]
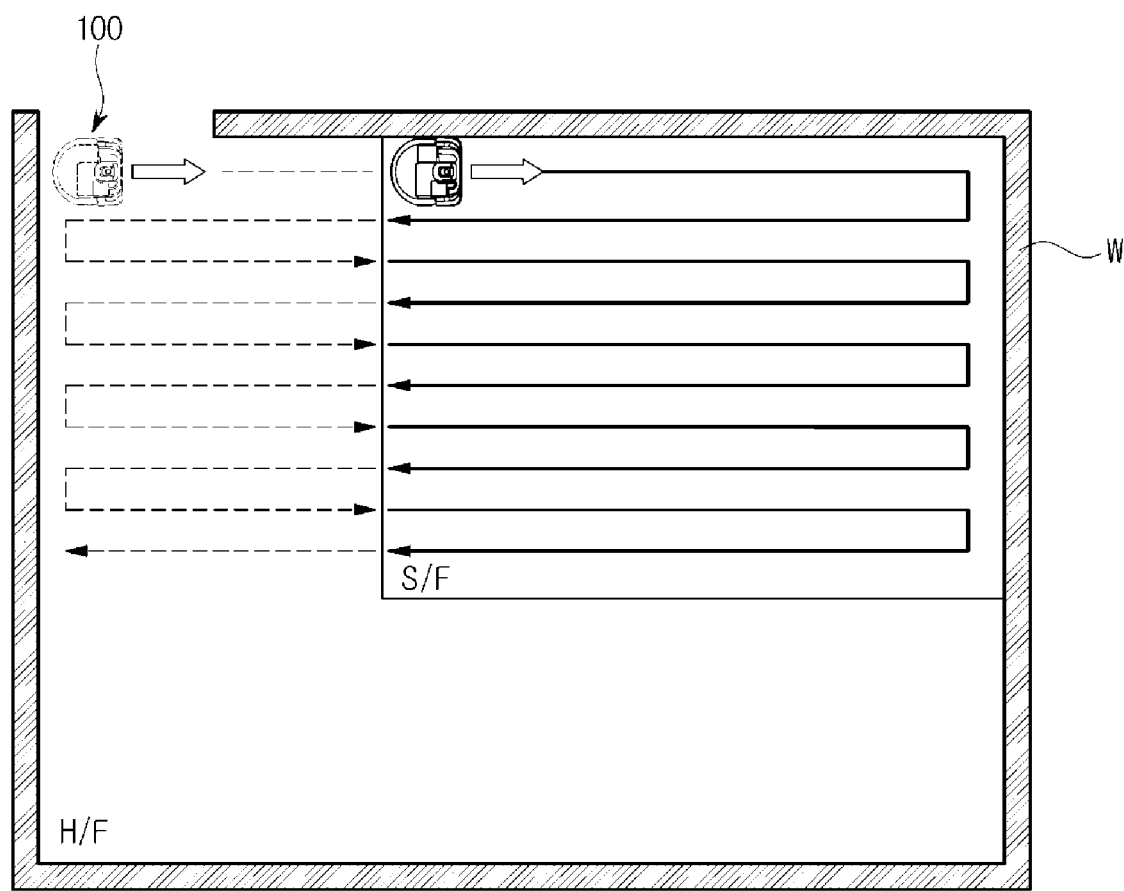

[Fig. 15]
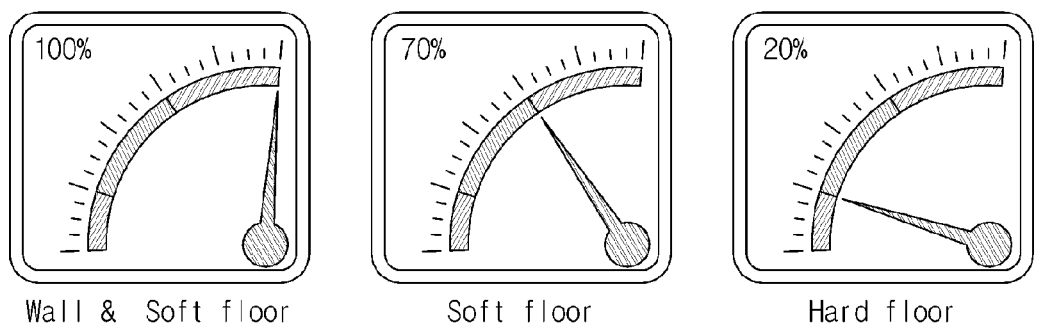

[Fig. 16]
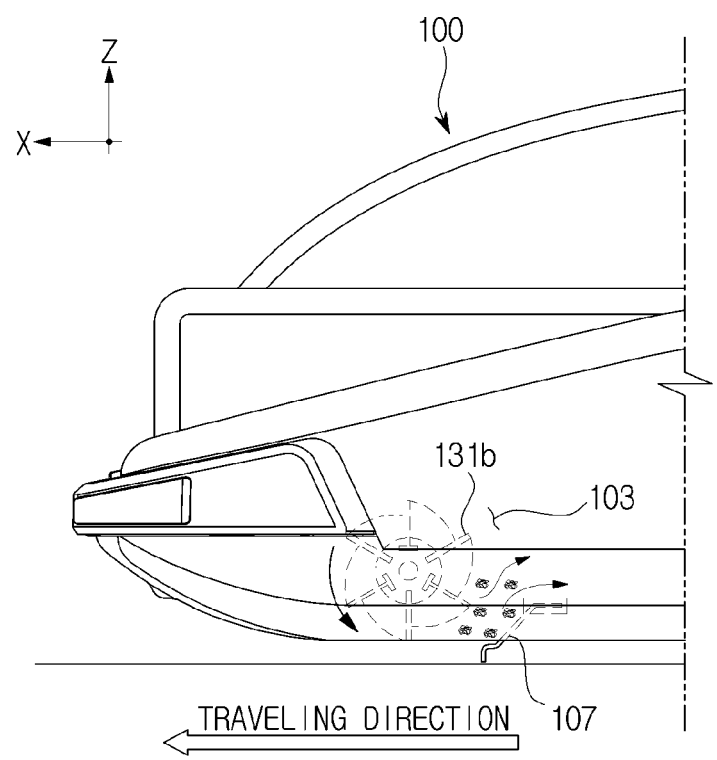

[Fig. 17]
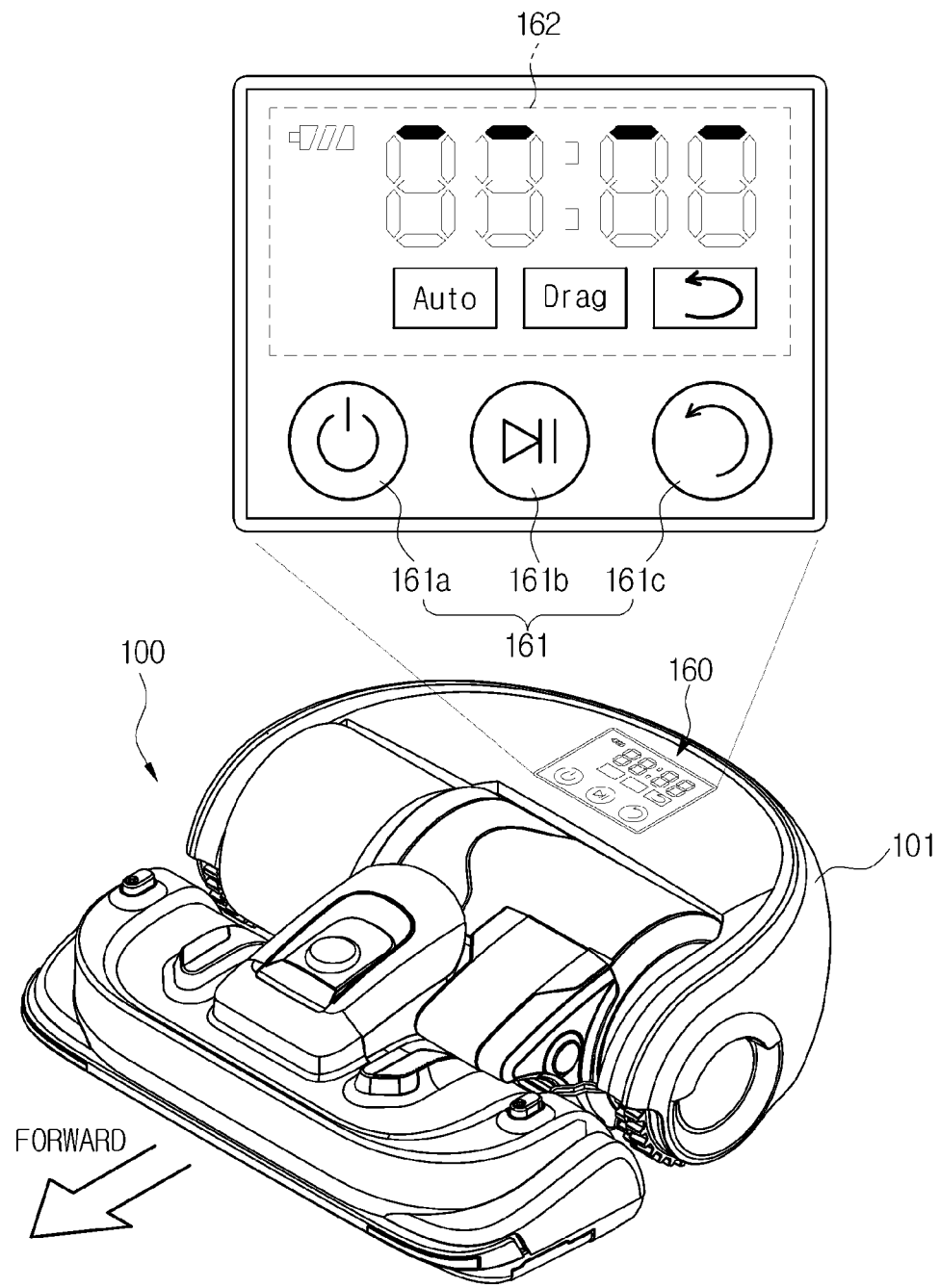

[Fig. 18]
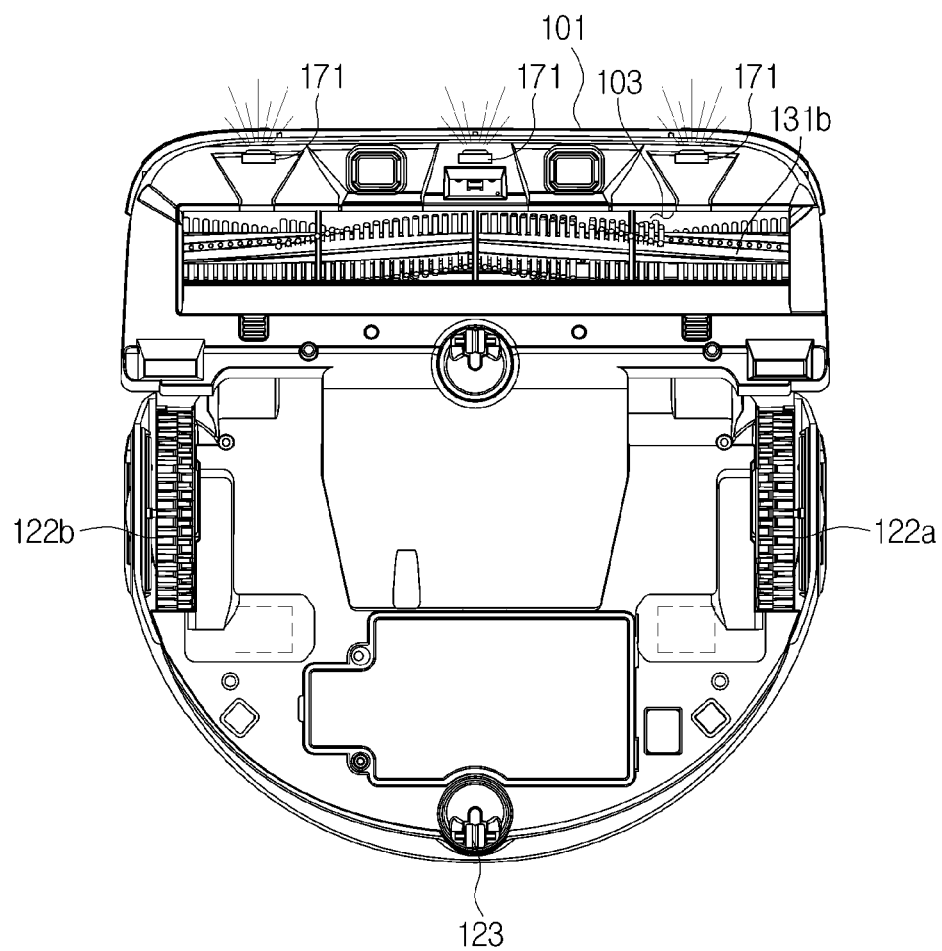

[Fig. 19]
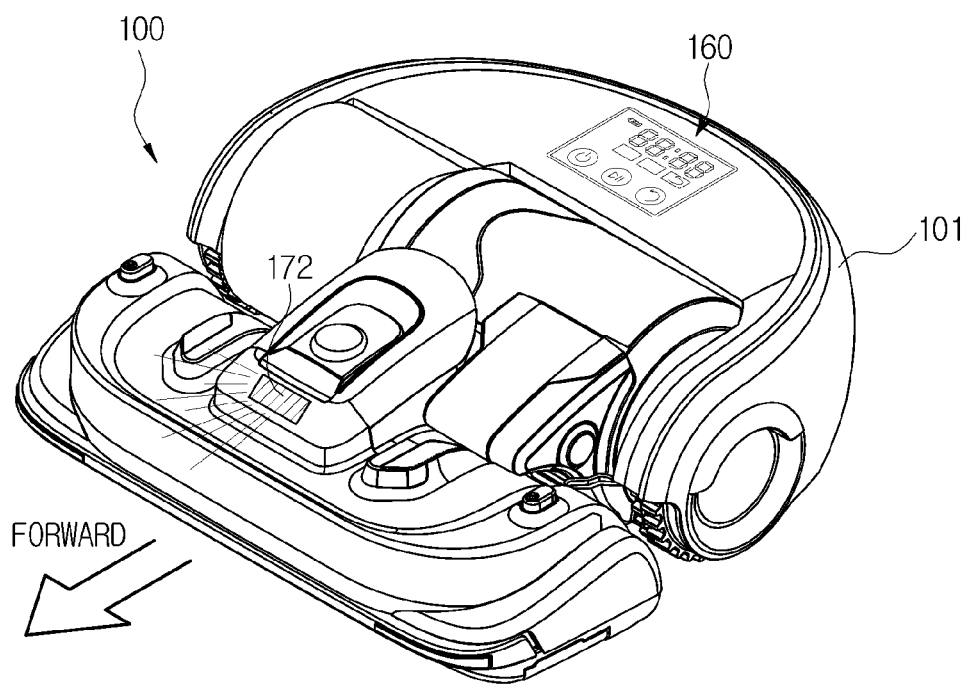

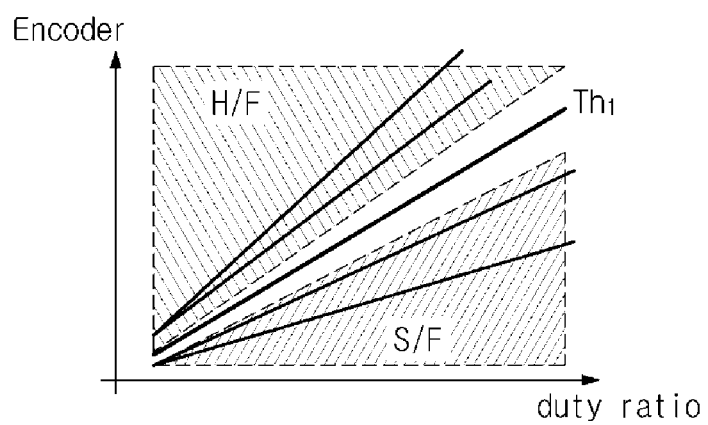
[Fig. 20]

[Fig. 21]
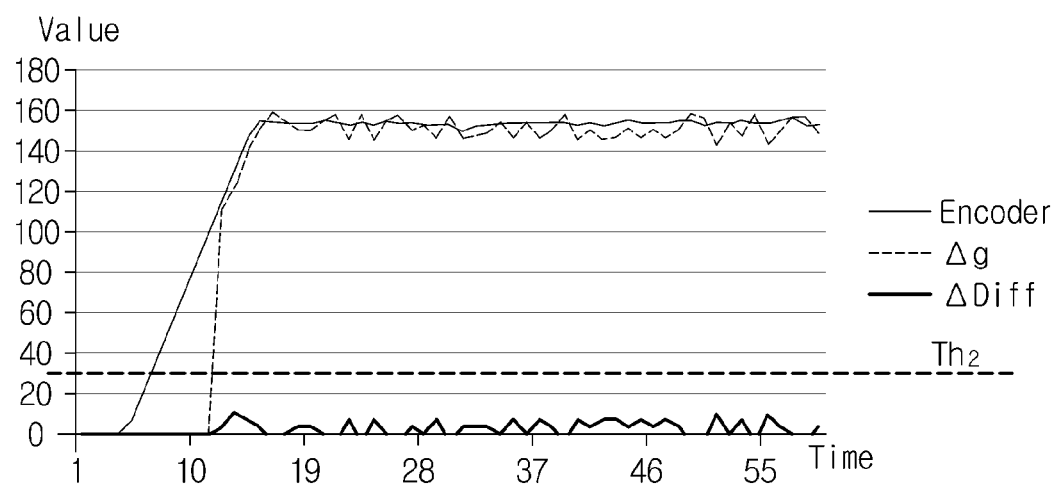

[Fig. 22]
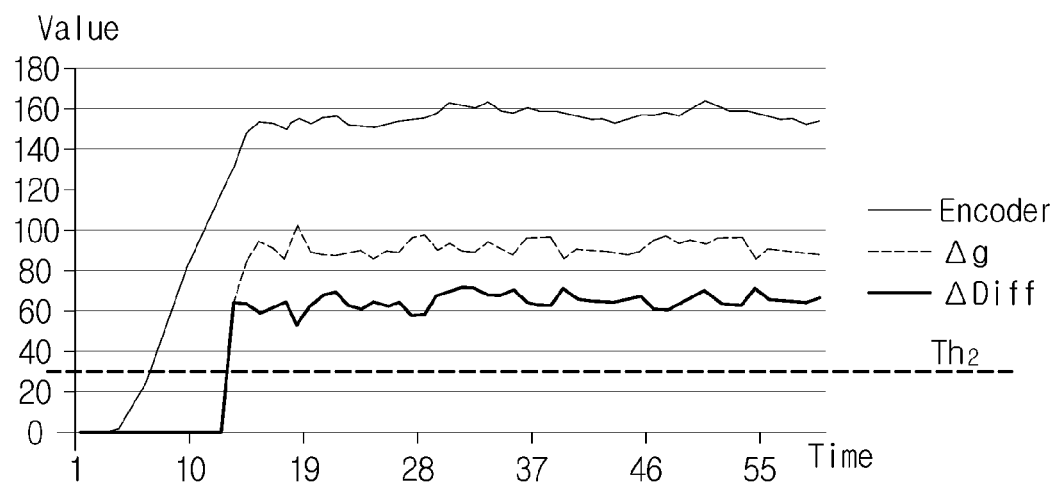

[Fig. 23]
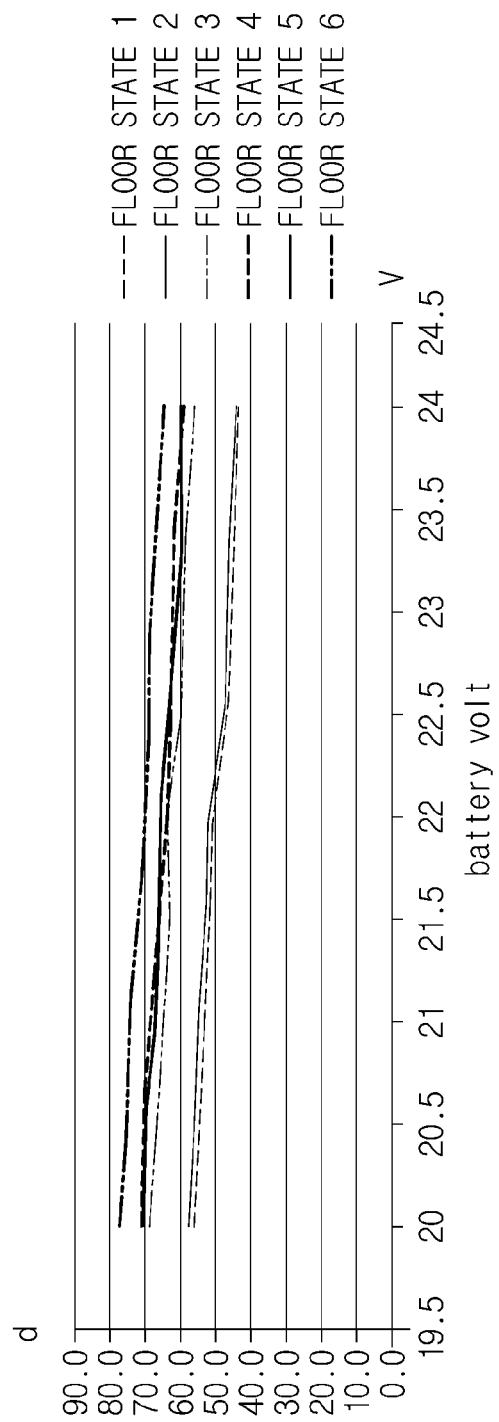

[Fig. 24]
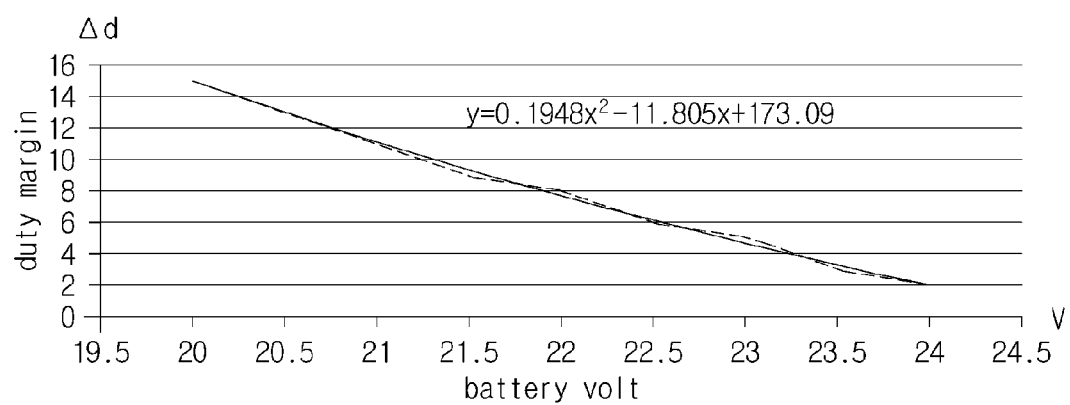

[Fig. 25]
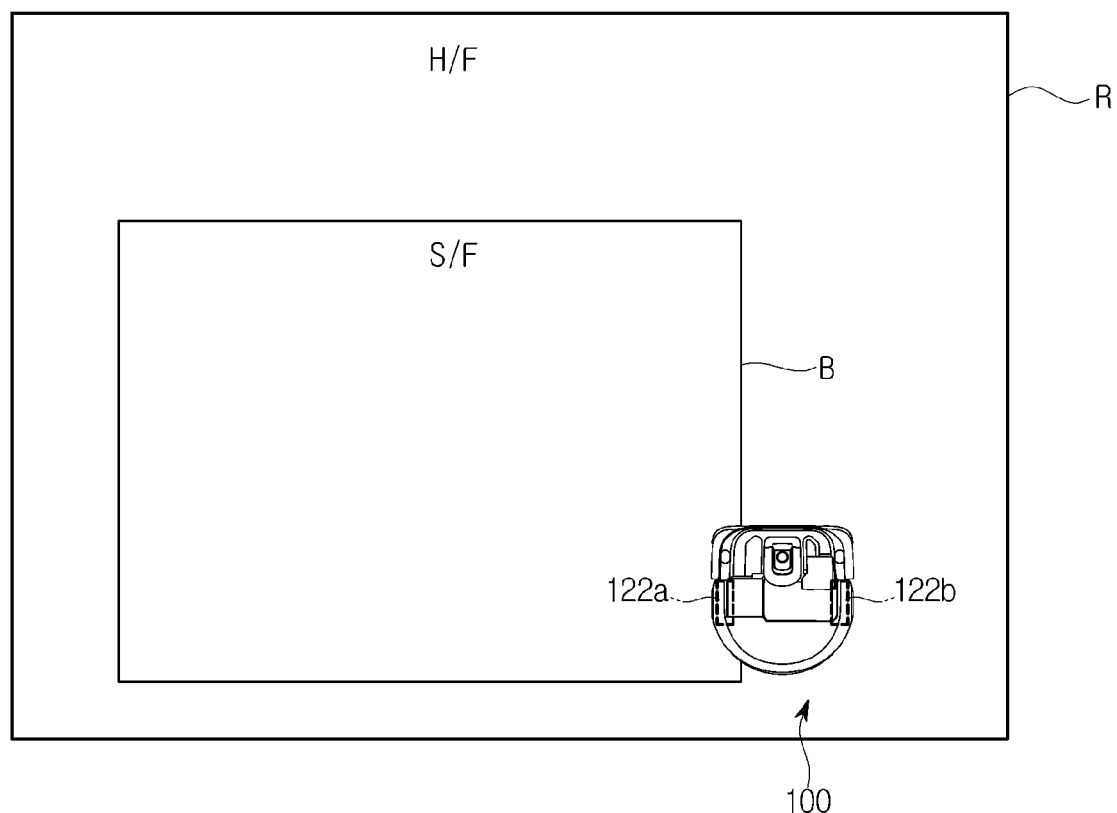

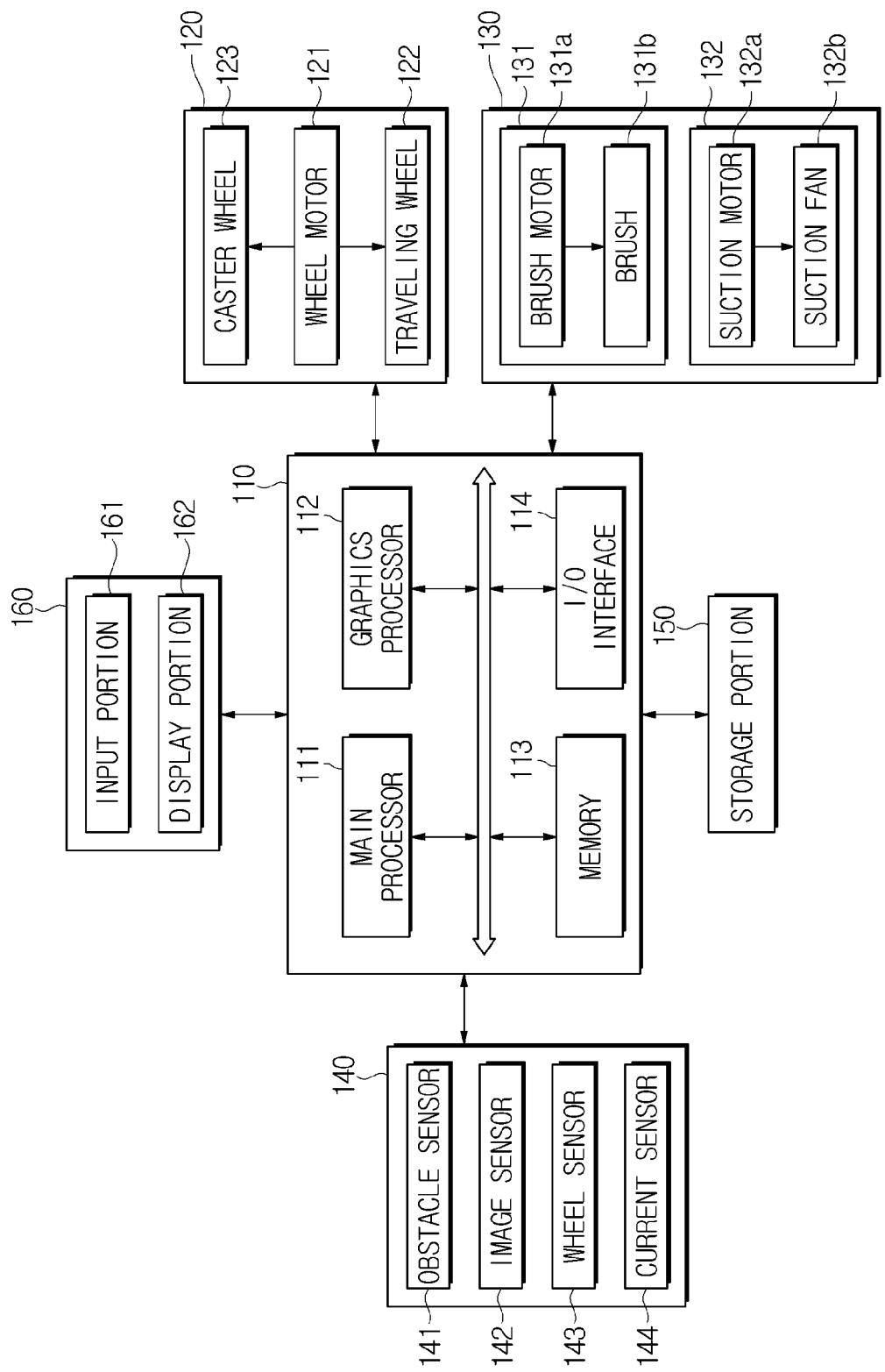

[Fig. 27]
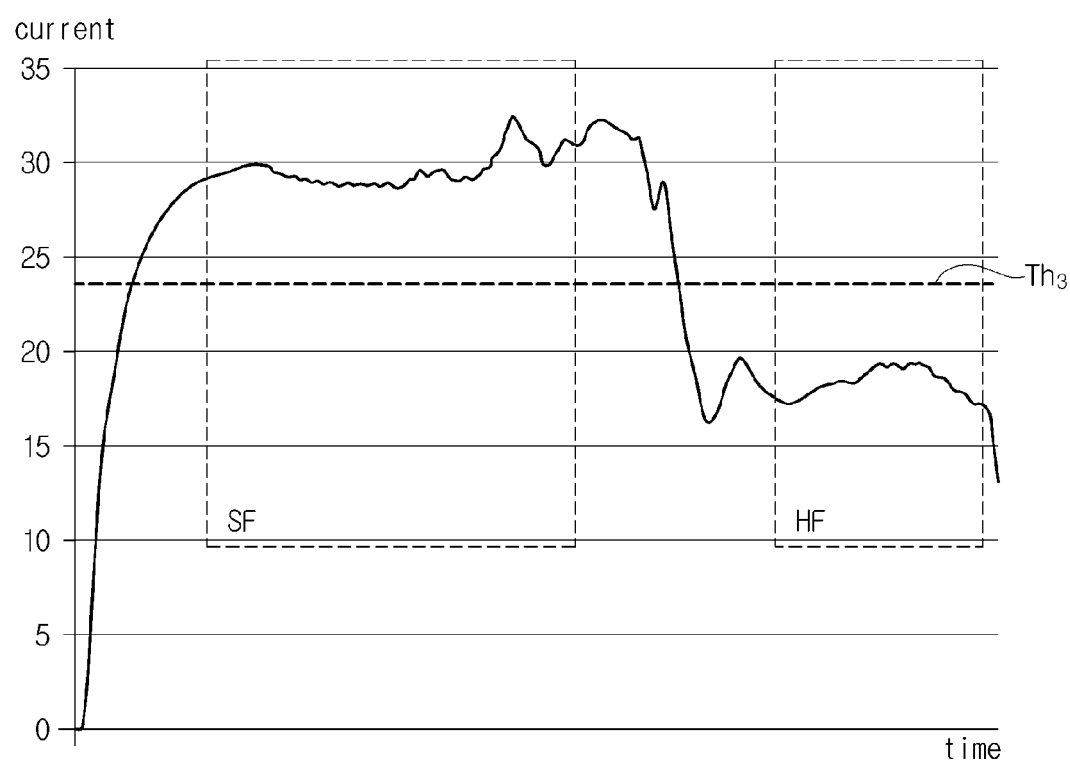

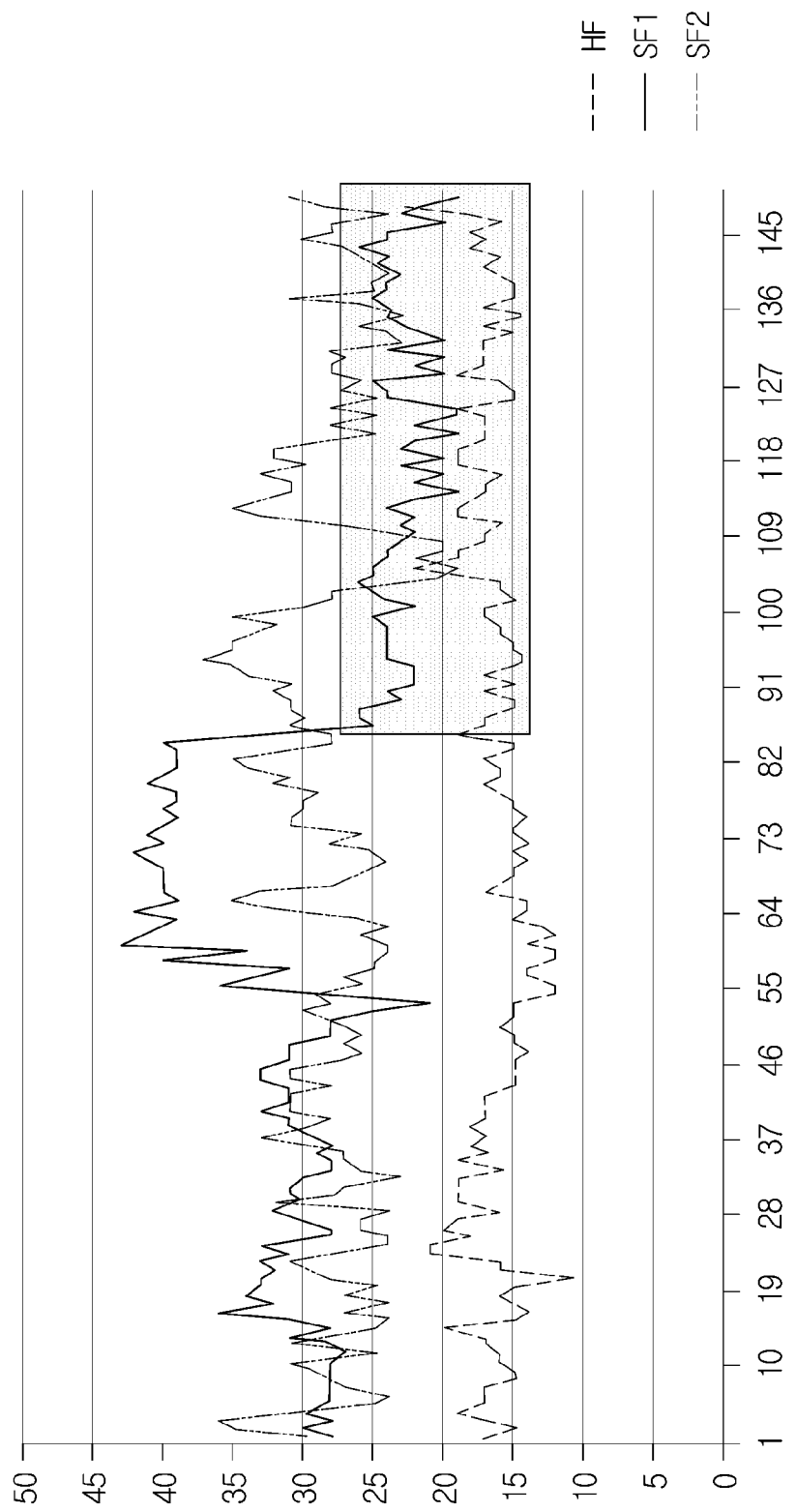
[Fig. 28]

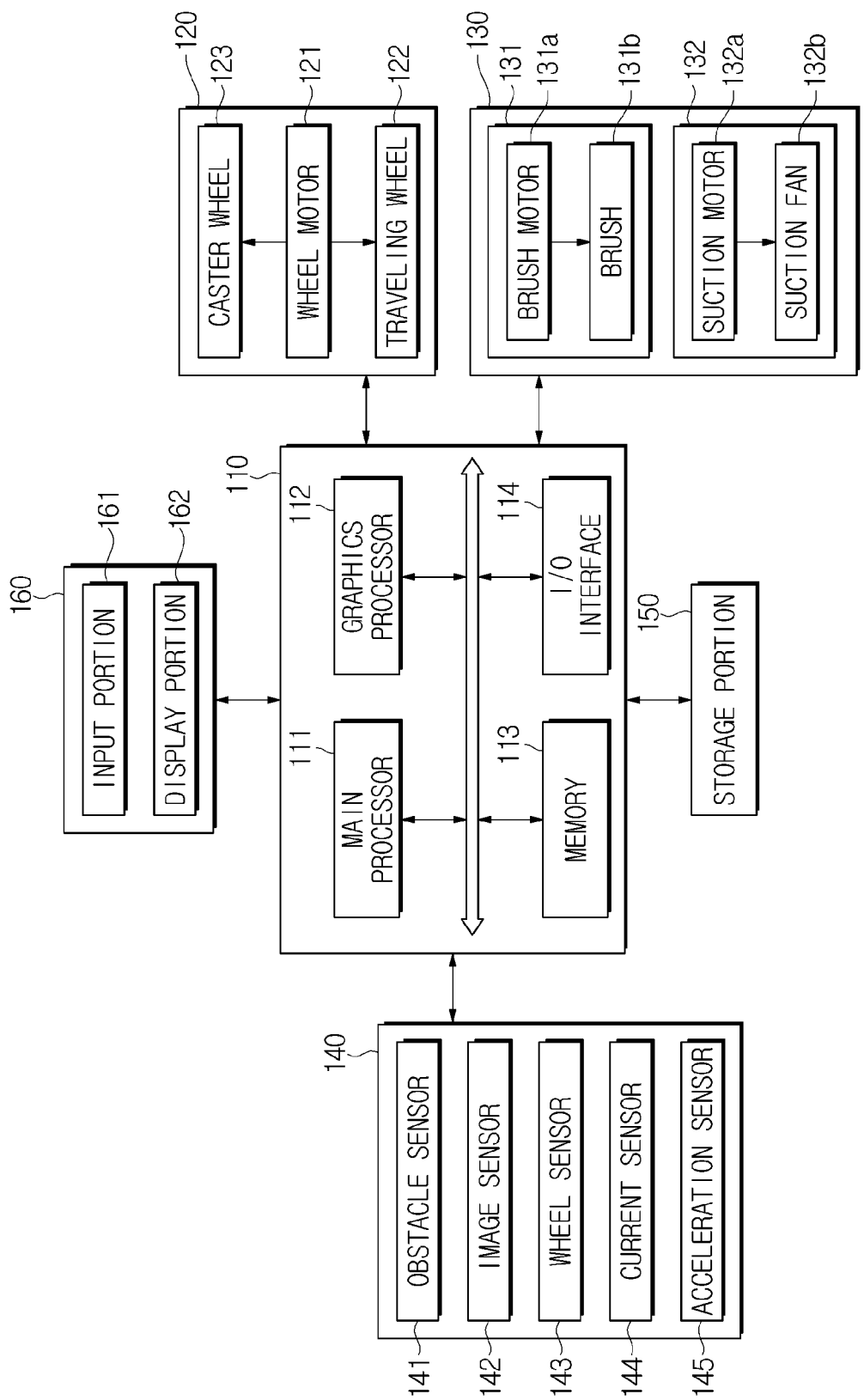

[Fig. 30]
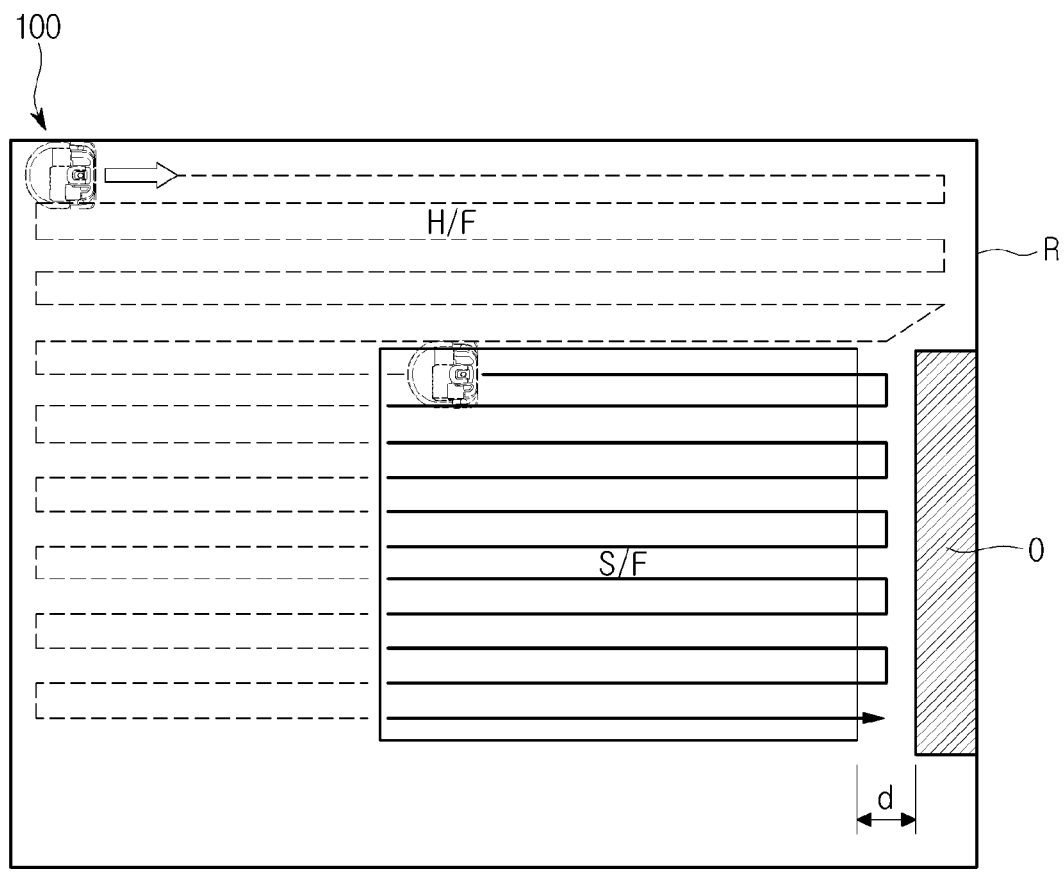

[Fig. 31]
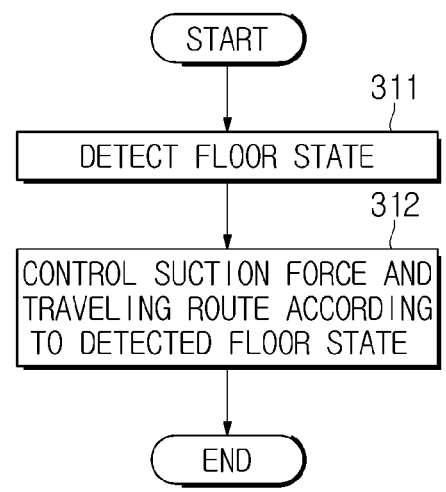

[Fig. 32]
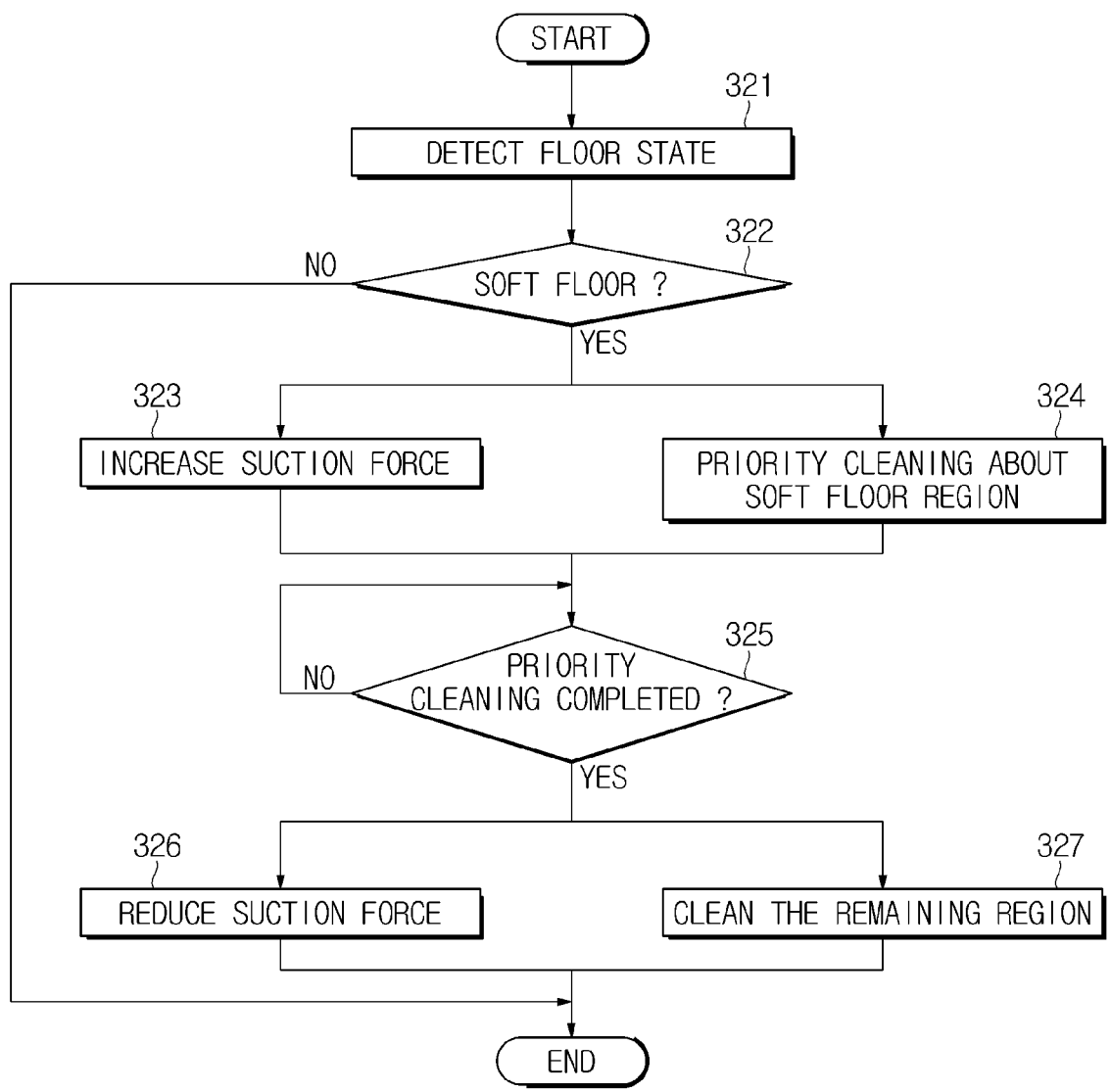

[Fig. 33]
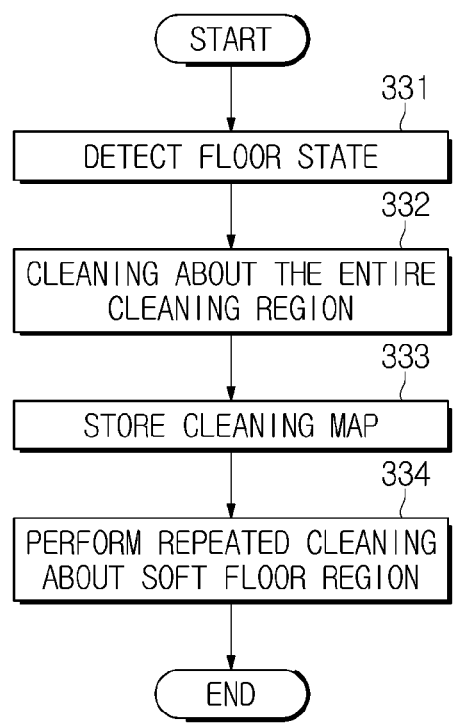

[Fig. 34]
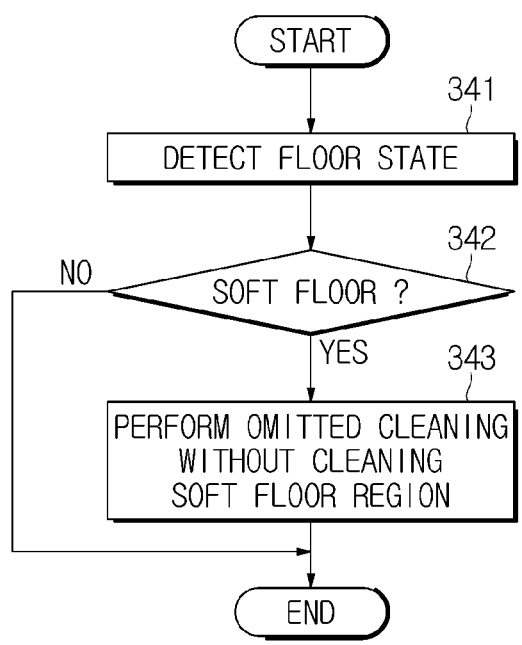

[Fig. 35]
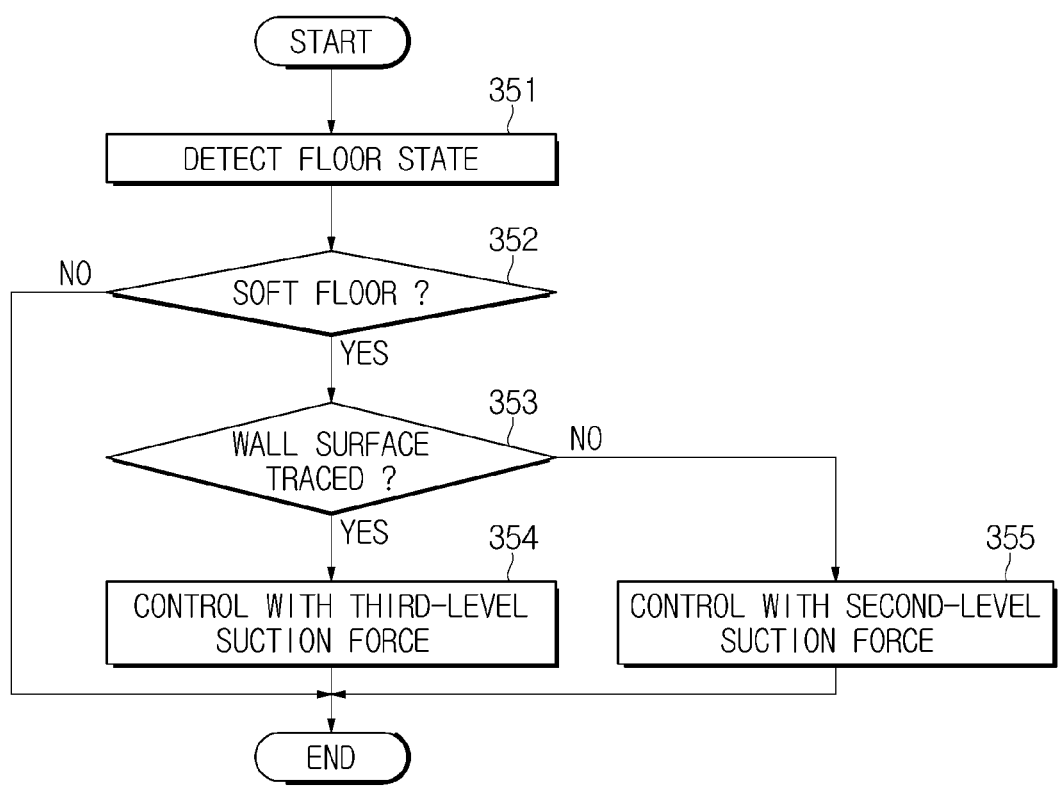

[Fig. 36]
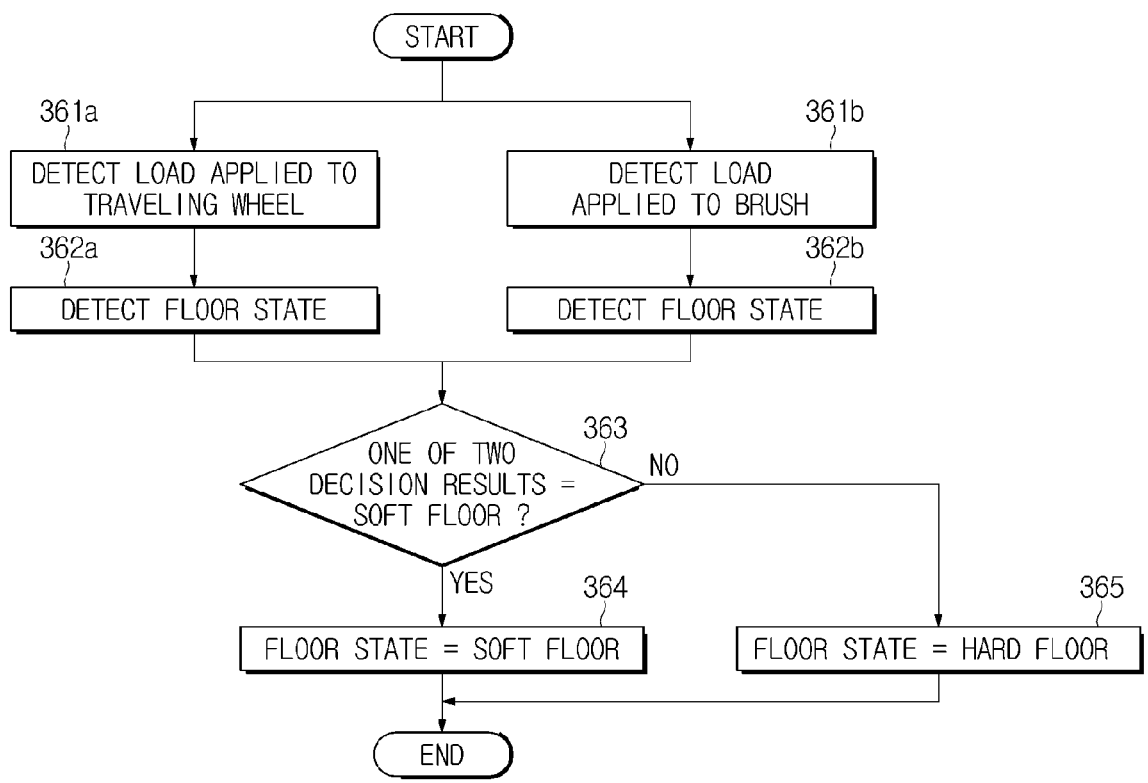

CLEANING ROBOT AND CONTROLLING METHOD THEREFOR

CROSS-REFERENCE TO RELATED APPLICATIONS AND CLAIM OF PRIORITY

This application is a 371 of International Application No. PCT/KR2016/010327, filed Sep. 13, 2016, which claims priority to Korean Patent Application No. 10-2015-0131497, filed Sep. 17, 2015, the disclosures of which are herein incorporated by reference in their entirety.

TECHNICAL FIELD

Embodiments of the present disclosure relate to a robot cleaner for detecting a floor state and a method for controlling the same.

BACKGROUND

A robot cleaner (also called a cleaning robot) is an apparatus that automatically cleans a traveling region by suctioning foreign substances, such as dust, etc., from a floor while autonomously traveling about the travelling region without user manipulation.

After a battery of the robot cleaner is charged at a docking station, the robot cleaner performs cleaning while wirelessly traveling in the cleaning region, such that the robot cleaner has a weak suction force lower than that of a general cleaner. Recently, although various robot cleaners with increased maximum suction force have been developed and rapidly come into widespread use, battery consumption gradually increases in proportion to suction force, such that it is necessary to properly control suction force of the robot cleaner so as to increase an operation time of the robot cleaner.

SUMMARY

An object of the present disclosure is to provide a robot cleaner and a method for controlling the same, which may perform efficient cleaning by controlling a suction force or traveling route of the robot cleaner.

Another object of the present disclosure is to provide a robot cleaner and a method for controlling the same, which may recognize a floor state by detecting load applied to wheels of the robot cleaner so as to increase reliability and accuracy in floor state decision.

A still another object of the present disclosure is to provide a robot cleaner and a method for controlling the same, which may recognize a floor state by combining load applied to wheels of the robot cleaner, load applied to brushes, and acceleration information of the robot cleaner with one another in a complementary manner, thereby increasing accuracy in floor state decision.

The objects of the present disclosure can be achieved by providing a robot cleaner including a traveling portion configured to include not only a traveling wheel to move a main body, but also a wheel motor to provide the traveling wheel with drive power, a cleaning portion configured to include not only a brush module formed at a lower part of the main body to scatter dust or foreign substances accumulated on a floor on which the main body travels, but also a suction module to suction the scattered dust or foreign substances, and a controller configured to determine a state of the floor, and control a suction force of the suction module and a traveling route of the main body according to the determined floor state.

The controller may control the suction force to be used in one case in which the floor state is a soft floor to be higher than the suction force to be used in the other case in which the floor state is a hard floor.

When the floor state is determined to be a soft floor during a cleaning traveling mode of the robot cleaner, the controller may control the traveling portion in a manner that priority cleaning about a region corresponding to the soft floor is performed.

When the floor state is determined to be a soft floor during a cleaning traveling mode of the robot cleaner, the controller may control the traveling portion in a manner that a region corresponding to the soft floor is repeatedly cleaned after an entire cleaning region is completely cleaned.

When the floor state is determined to be a soft floor during a cleaning traveling mode of the robot cleaner, the controller may control the traveling portion in a manner that a remaining region other than a region corresponding to the soft floor from among an entire cleaning region is cleaned.

When the floor state is determined to be a soft floor and the robot cleaner performs a cleaning traveling mode while simultaneously tracing a wall surface, the controller may control the suction force to be higher than a suction force needed when the robot cleaner performs cleaning without tracing the wall surface.

The controller may control the traveling portion in a manner that the robot cleaner performs cleaning while simultaneously traveling along a light spot formed on the floor.

When the floor state is determined to be a soft floor while the traveling portion performs traveling based on the light spot, the controller may control the traveling portion in a manner that priority cleaning about a region corresponding to the soft floor is performed and the traveling portion returns to the traveling based on the light spot.

The robot cleaner may further include a sensing portion configured to detect a load applied to the traveling wheel.

The controller may determine the floor state on the basis of a load applied to the traveling wheel.

The sensing portion may include a wheel sensor to detect revolutions per minute (RPM) of the wheel motor.

The controller may determine the floor state on the basis of the rpm of the wheel motor and a duty ratio of the wheel motor.

The controller may determine the floor state by comparing a parameter ($\Delta D$) calculated by the following equation 2 with a predetermined reference value, $$\Delta D = E - g^* \Delta w \qquad \text{Equation 1}$$

wherein, E is an rpm of the wheel motor, g is obtained by dividing the rpm of the wheel motor by the duty ratio of the wheel motor, and $\Delta w$ is a weight based on a linear velocity.

The controller may control the duty ratio according to voltage reduction of a battery configured to provide the wheel motor with a power-supply voltage, and may determine the floor state on the basis of the duty ratio controlled by reduction of the battery voltage.

When the load applied to the traveling wheel is equal to or higher than a predetermined reference value, the controller may determine the floor state to be a soft floor.

When the load applied to the traveling wheel is less than the predetermined reference value, the controller may determine the floor state to be a hard floor.

The brush module may include a brush mounted to a lower part of the main body so as to scatter dust or foreign substances, and a brush motor to rotate the brush. The sensing portion may further detect a load applied to the brush.

The controller may determine the floor state on the basis of the load applied to the brush and the load applied to the traveling wheel.

The robot cleaner may further include a current sensor to measure a current of the brush motor.

When the load applied to the brush is equal to or higher than a first reference value, or when the load applied to the traveling wheel is equal to or higher than a second reference value, the controller may determine the floor state to be a soft floor.

The robot cleaner may further include an acceleration sensor to detect acceleration of the main body.

The controller may determine the floor state on the basis of the load applied to the brush module, the load applied to the traveling wheel, and acceleration of the main body.

When the main body travels over an obstacle or moves down from the obstacle, the controller may determine that the floor state is not identical to the soft floor.

The robot cleaner may further include a display portion provided to the main body, and the display portion may indicate that the floor state is a soft floor.

The robot cleaner may further include a light source provided to at least one of a lower part and an upper part of the main body so as to emit light. The light source may emit the light when the floor state is a soft floor.

The robot cleaner may further include a blade to guide dust or foreign substances scattered by the brush module into a dust box formed in the main body. When the floor state is determined to be the soft floor, the controller may control the blade to move down.

If there is a high possibility of falling of the robot cleaner, the controller may control the traveling portion to move the main body backward. In this case, when the floor state is a soft floor, the controller may control the main body to move backward by a longer distance as compared to the other case in which the floor state is a hard floor.

The robot cleaner may further include a storage portion to store not only position information corresponding to a region of the soft floor from among the entire cleaning region, but also position information corresponding to a region of the hard floor.

The controller may calculate a minimum charging ratio of a battery on the basis of the stored position information regarding the soft floor region, the stored position information regarding the hard floor region, a suction force corresponding to the soft floor, and a suction force corresponding to the hard floor.

When the battery is charged with electricity corresponding to the minimum charging ratio, the controller may control the traveling portion in a manner that the cleaning region is re-cleaned.

When the soft floor region is re-cleaned, the sensing portion may detect the floor state at the position of the soft floor region. When the detected floor state is not identical to the soft floor, the controller may not perform the re-cleaning of the soft floor region or may perform re-cleaning about the entire cleaning region.

When a border section between the soft floor region and the hard floor is shorter than a predetermined length, the controller may control the suction force to be kept at a previous suction force generated before the robot cleaner enters the border section.

After the cleaning region is completely cleaned, when a ratio of the soft floor region to the entire cleaning region is equal to or higher than a predetermined ratio, the controller may output an instruction signal for guiding a user to empty the dust box.

In accordance with another aspect of the present disclosure, a robot cleaner includes a traveling portion configured to include not only a traveling wheel to move a main body, but also a wheel motor to provide the traveling wheel with drive power, a cleaning portion configured to include not only a brush formed at a lower part of the main body, but also a brush motor to rotate the brush, a sensing portion configured to detect a load applied to the traveling wheel, and a controller configured to determine a state of the floor on which the main body moves on the basis of the load applied to the traveling wheel.

When the load applied to the traveling wheel is equal to or higher than a predetermined reference value, the controller may determine the floor state to be a soft floor.

When the load applied to the traveling wheel is less than the predetermined reference value, the controller may determine the floor state to be a hard floor.

The sensing portion may include a wheel sensor to detect revolutions per minute (RPM) of the wheel motor.

The controller may determine the floor state on the basis of the rpm of the wheel motor and a duty ratio of the wheel motor.

The controller may determine the floor state by comparing a parameter ($\Delta D$) calculated by the following equation 2 with a predetermined reference value, $$\Delta D = E - g * \Delta w \qquad \text{Equation 2}$$

wherein, E is an rpm of the wheel motor, g is obtained by dividing the rpm of the wheel motor by the duty ratio of the wheel motor, and $\Delta w$ is a weight based on a linear velocity.

The controller may control the duty ratio according to voltage reduction of a battery configured to provide the wheel motor with a power-supply voltage, and may determine the floor state on the basis of the duty ratio controlled by reduction of the battery voltage.

The controller may further detect a load applied to the brush.

The controller may determine the floor state on the basis of the load applied to the brush and the load applied to the traveling wheel.

When the load applied to the brush is equal to or higher than a first reference value, or when the load applied to the traveling wheel is equal to or higher than a second reference value, the controller may determine the floor state to be a soft floor.

The sensing portion may include a wheel sensor configured to detect revolutions per minute (RPM) of the wheel motor, and a current sensor configured to detect a current of the brush motor.

The sensing portion may further detect acceleration of the main body.

The controller may determine the floor state on the basis of the load applied to the traveling wheel, the load applied to the brush, and acceleration of the main body.

In accordance with another aspect of the present disclosure, a method for controlling a robot cleaner which performs cleaning while simultaneously traveling on a floor includes: determining whether the floor state is a soft floor or a hard floor; controlling a suction force to be used in one case in which the floor state is the soft floor to be higher than a suction force to be used in the other case in which the floor state is the hard floor; and performing any one of priority cleaning, repeated cleaning, and omitted cleaning about a region corresponding to the soft floor.

The performing the priority cleaning about the region corresponding to the soft floor may include: performing priority cleaning about the region corresponding to the soft floor; and cleaning a remaining region other than the soft floor region from among an entire cleaning region after finishing cleaning of the soft floor region.

The performing the repeated cleaning about the region corresponding to the soft floor may include, after finishing cleaning about an entire cleaning region including the soft floor region, performing repeated cleaning about the soft floor region.

The performing the omitted cleaning about the region corresponding to the soft floor may include cleaning a remaining region other than the soft floor region from among an entire cleaning region.

As is apparent from the above description, the robot cleaner and the method for controlling the same according to the embodiments of the present disclosure may perform efficient cleaning by controlling a suction force or traveling route of the robot cleaner according to a floor state.

The robot cleaner and the method for controlling the same according to the embodiments of the present disclosure may detect load caught in wheels of the robot cleaner so as to increase reliability and accuracy in floor state decision, thereby recognizing a floor state.

The robot cleaner and the method for controlling the same according to the embodiments of the present disclosure may recognize a floor state by combining load caught in wheels of the robot cleaner, load caught in brushes, and acceleration information of the robot cleaner with one another in a complementary manner, thereby increasing accuracy in floor state decision.

BRIEF DESCRIPTION OF THE DRAWINGS

The accompanying drawings, which are included to provide a further understanding of the invention, illustrate embodiments of the invention and together with the description serve to explain the principle of the invention.

FIG. 1 is a control block diagram illustrating a robot cleaner according to an embodiment of the present disclosure.

FIG. 2 is a view illustrating the external appearance of a robot cleaner according to an embodiment of the present disclosure.

FIG. 3 is a detailed control block diagram illustrating a robot cleaner according to an embodiment of the present disclosure.

FIG. 4 is a view illustrating an internal structure of a robot cleaner according to an embodiment of the present disclosure.

FIG. 5 is a bottom view illustrating a robot cleaner according to an embodiment of the present disclosure.

FIG. 6 is a conceptual diagram illustrating a method for allowing a robot cleaner to control suction force according to floor states according to an embodiment of the present disclosure.

FIGS. 7 to 9 are views illustrating various examples for allowing the robot cleaner to control a traveling route according to floor states according to an embodiment of the present disclosure.

FIG. 10 is a conceptual diagram illustrating a method for allowing the robot cleaner to control an exemplary case in which the robot cleaner detects a fall.

FIG. 11 is a conceptual diagram illustrating a method for allowing the robot cleaner to control an exemplary case in which the environment stored in a cleaning map is changed.

FIG. 12 is a conceptual diagram illustrating a method for allowing the robot cleaner to move according to a point cleaning operation according to an embodiment of the present disclosure.

FIG. 13 is a conceptual diagram illustrating a traveling route used in an exemplary case in which the robot cleaner detects a soft floor while in motion according to a point cleaning operation.

FIG. 14 is a conceptual diagram illustrating an exemplary case in which the robot cleaner performs cleaning and traveling while simultaneously tracing a wall surface according to an embodiment of the present disclosure.

FIG. 15 is a conceptual diagram illustrating a method for allowing the robot cleaner to control suction force according to a floor state and information as to whether a wall surface is traced according to an embodiment of the present disclosure.

FIG. 16 is a view illustrating a blade structure of the robot cleaner according to an embodiment of the present disclosure.

FIGS. 17 to 19 are conceptual diagrams illustrating examples in which the robot cleaner informs a user of soft floor detection according to an embodiment of the present disclosure.

FIG. 20 is a graph illustrating the relationship between an encoder output and a duty ratio according to floor states.

FIG. 21 is a graph illustrating encoder outputs and calculation values of a controller when a floor state is a hard floor.

FIG. 22 is a graph illustrating encoder outputs and calculation values of a controller when a floor state is a soft floor.

FIG. 23 is a graph illustrating floor states and duty ratios for each battery voltage.

FIG. 24 is a graph illustrating a deviation between duty ratios for each battery voltage.

FIG. 25 is a conceptual diagram illustrating an exemplary case in which the robot cleaner is located at a border between a region corresponding to the soft floor and the other region corresponding to the hard floor according to an embodiment of the present disclosure.

FIG. 26 is a control block diagram illustrating a robot cleaner further including a current sensor.

FIG. 27 is a graph illustrating an exemplary current measured by a current sensor.

FIG. 28 is a graph illustrating an exemplary current measured for each floor state.

FIG. 29 is a control block diagram illustrating a robot cleaner further including an acceleration sensor.

FIG. 30 is a conceptual diagram illustrating a method for allowing the robot cleaner to control an exemplary case in which a border region between a soft floor region and a hard floor region is short in length.

FIG. 31 is a flowchart illustrating a method for controlling a robot cleaner according to an embodiment of the present disclosure.

FIG. 32 is a flowchart illustrating a method for allowing the robot cleaner to perform priority cleaning of the soft floor according to an embodiment of the present disclosure.

FIG. 33 is a flowchart illustrating a method for allowing the robot cleaner to perform repeated cleaning of the soft floor according to an embodiment of the present disclosure.

FIG. 34 is a flowchart illustrating a method for allowing the robot cleaner to omit cleaning of the soft floor according to an embodiment of the present disclosure.

FIG. 35 is a flowchart illustrating a method for allowing the robot cleaner to perform cleaning and traveling while simultaneously tracing a wall surface according to an embodiment of the present disclosure.

FIG. 36 is a flowchart illustrating a method for allowing the robot cleaner to recognize a floor state according to an embodiment of the present disclosure.

DETAILED DESCRIPTION

Reference will now be made in detail to the embodiments of the present disclosure, examples of which are illustrated in the accompanying drawings, wherein like reference numerals refer to like elements throughout. A robot cleaner and a method for controlling the same according to embodiments of the present disclosure will hereinafter be described with reference to the attached drawings.

FIG. 1 is a control block diagram illustrating a robot cleaner according to an embodiment of the present disclosure. FIG. 2 is a view illustrating the external appearance of a robot cleaner according to an embodiment of the present disclosure.

Referring to FIGS. 1 and 2, a robot cleaner 100 according to the embodiment may include a sensing portion 140 configured to acquire information to be used for recognizing a floor state on which the robot cleaner 100 travels, a traveling portion 120 configured to move a main body 101, a cleaning portion 130 configured to perform cleaning by scattering dust accumulated on the floor and suctioning the scattered dust during traveling of the robot cleaner 100, a storage portion 150 configured to store information regarding the traveling route of the robot cleaner 100, a user interface 160 configured to receive a control command from the user and display state information of the robot cleaner 100, and a controller 110 configured to control the traveling portion 120 and the cleaning portion 130 on the basis of the detection result of the sensing portion 140 or the control command applied to the user interface 160.

The traveling portion 120 may include traveling wheels 122*a* and 122*b* respectively mounted to left and right sides of the main body 101. The controller 110 may move the main body 101 by rotation of the traveling wheels 122*a* and 122*b*, and may control the cleaning portion 130 during movement of the main body 101, thereby cleaning the floor.

In the following embodiment to be described later, movement of the main body 101 may refer to traveling of the robot cleaner 100, and the operation for allowing the robot cleaner 100 to travel and clean the floor will hereinafter be referred to as a cleaning traveling operation.

The controller 110 may recognize the floor state on the basis of the detection result of the sensing portion 140, and may control the suction force and traveling route of the cleaning portion 130 on the basis of the recognized floor state.

The floor states to be recognized by the controller 110 may include a hard floor and a soft floor. The hard floor may refer to a smooth and hard floor such as a wooden floor, a tiled floor, a vinyl floor, etc. The soft floor may refer to a floor, such a carpet, having high resistance due to wool (or other fabric) and thus the robot cleaner 100 cannot easily move forward or backward. The carpet is a one-faced or double-faced three-dimensional textile product woven with pile yarns. The carpet is classified into a cut pile carpet and a loop pile carpet. The cut pile carpet is formed by cutting all of the looped fibers at the top of bundles, thereby creating an upright pile. The loop pile carpet is woven with loops of threads at its surface. If the floor state is a soft floor, the detection result of the controller 110 may be changed according to carpet types.

If a carpet is located on the floor, the floor covered with the carpet has higher resistance than the other floor having no carpet because the floor covered with the carpet has much dust or foreign substances inserted between carpet yarns, such that a higher suction force is needed for the robot cleaner to move on the carpet. Accordingly, the controller 110 may increase the suction force of the cleaning portion 130 when the floor state is the soft floor as compared to the other case in which the floor state is the hard floor, thereby increasing cleaning efficiency. In contrast, the controller 110 may relatively reduce the suction force of the cleaning portion 130 when the floor state is the hard floor, such that unnecessary power consumption is reduced and an available cleaning time of the robot cleaner 100 is elongated.

FIG. 3 is a detailed control block diagram illustrating the robot cleaner according to an embodiment of the present disclosure. FIG. 4 is a view illustrating an internal structure of the robot cleaner according to an embodiment of the present disclosure. FIG. 5 is a bottom view illustrating the robot cleaner according to an embodiment of the present disclosure.

Referring to FIGS. 3 to 5, the traveling portion 120 may include a traveling wheel 122 (composed of wheels 122*a* and 122*b*) respectively located at left and right ends of the main body 101, a caster wheel 123 provided at the bottom surface of the main body 101, and a wheel motor 121 to supply the traveling wheels 122 and the caster wheel 123 with drive power.

The traveling wheel 122 may rotate to move the main body 101, and may include a left traveling wheel 122*a* arranged to a left side of the main body 101 on the basis of a front part (X-axis direction) of the main body 101, and a right traveling wheel 122*b* arranged to a right side of the main body 101.

By rotation of the traveling wheel 122, the main body 101 may move forward or backward or may rotate. For example, when both the left and right traveling wheels 122*a* and 122*b* rotate while moving forward, the main body 101 may move straight in a forward direction. When both the left and right traveling wheels 122*a* and 122*b* rotate while moving backward, the main body 101 may move straight in a backward direction.

In addition, if the left and right traveling wheels 122*a* and 122*b* rotate at different speeds while rotating in the same direction, the main body 101 may perform curvilinear traveling to the right or left. When the left and right traveling wheels 122*a* and 122*b* rotates in different directions, the main body 101 may rotate clockwise or counterclockwise.

The wheel motor 121 may generate rotational force to rotate the traveling wheel 122. Although the wheel motor 121 may be implemented as a DC or BLDC motor, the scope or spirit of the wheel motor 121 for use in the robot cleaner 100 according to the embodiments is not limited thereto in the same manner as in other motors contained in the robot cleaner 100.

The wheel motor 121 may include a left wheel motor 121*a* configured to rotate the left traveling wheel 122*a* and a right wheel motor 121*b* configured to rotate the right traveling wheel 122*b*.

The left and right wheel motors 121*a* and 121*b* may independently operate according to a control signal of the controller 110, and the main body 101 may move forward or backward or rotate according to operations of the left and right wheel motors 121a and 121b.

The caster wheel 123 is installed at the bottom of the main body 101 so that the caster wheel 123 may rotate in response to a movement direction of the main body 101. In addition, the caster wheel 123 may cause the main body 101 to move while maintaining a stable posture.

The traveling portion 120 may further include a caster wheel motor (not shown) configured to generate rotational force to be supplied to the caster wheel 123.

The cleaning portion 130 may include a brush module 131 to scatter dust or foreign substances from the floor to be cleaned, and a suction module 132 to suction the scattered dust or foreign substances.

The brush module 131 may include a brush 131b rotating to scatter dust or foreign substances accumulated on the floor to be cleaned, and a brush motor 131a to generate rotational force to be supplied to the brush 131b. In this case, the brush 131b may also be referred to as a drum brush as necessary.

The brush 131b may be provided at a suction inlet 103 formed at the bottom of the main body 101, and rotates about a rotation axis (parallel to a Y-axis direction) perpendicular to a forward direction (X-axis direction) of the main body 101 so that the dust from the floor to be cleaned is scattered into the suction inlet 103.

The suction module 132 may suction the dust scattered by the brush 131b into a dust box 105, and may include a suction fan 132b to generate suction force needed to suction the dust into the dust box 105 and a suction motor 132a to generate drive power needed to rotate the suction fan 132b.

The sensing portion 140 may include an obstacle sensor 141 to detect an obstacle existing in a cleaning region to be cleaned, an image sensor 142 to acquire peripheral images of the cleaning region, and a wheel sensor 143 to detect revolutions per minute (RPM) of the wheel motor 121.

The obstacle sensor 141 may detect the presence or absence of an obstacle existing on a traveling route of the robot cleaner 100. The obstacle may refer to all kinds of objects that protrude from the bottom of the cleaning space and obstruct movement of the robot cleaner 100. For example, the obstacle may include furniture such as a table or sofa, and may also include the surface of a wall through which the cleaning space is divided. In addition, the obstacle may further include an object, such as a threshold (doorstep) or a round bar, through which the robot cleaner 100 moves upward or downward.

In more detail, the obstacle sensor 141 may non-contactively detect the presence or absence of an obstacle using infrared light, visible light, or electromagnetic waves such as ultrasonic waves. For example, the obstacle sensor 141 may emit infrared light, detect the infrared light reflected from the obstacle, and output intensity of the detected infrared light or a Time Of Flight (TOF) difference between the emitted infrared light and the reflected infrared light to the controller 110. The controller 110 may recognize the presence or absence of an obstacle on the basis of the output value of the obstacle sensor 141, or may calculate a distance between the robot cleaner 100 and the obstacle on the basis of the output value of the obstacle sensor 141.

The obstacle sensor 141 may include an emitting portion 141a to emit electromagnetic waves and a receiving portion 141b to receive the electromagnetic waves reflected from the obstacle. The emitting portion 141a may be provided at a front part of the main body 101, and may emit electromagnetic waves in a forward direction of the main body 101. In addition, the emitting portion 141a may include a light emitting diode (LED) to generate electromagnetic waves and a wide-angle lens to scatter the electromagnetic waves in various directions by refracting the generated electromagnetic waves.

The user interface 160 may include an input portion 161 to receive a control command from the user, and a display portion 162 to display one screen showing a state of the robot cleaner 100 or the other screen guiding the user to input a control command.

The control command entered by the user through the input portion 161 may include a command for selecting any one of cleaning modes composed of an automatic cleaning mode and a manual cleaning mode, and a command for selecting a suction mode. For example, the suction mode may include three modes, i.e., a first mode, a second mode, and a third mode. The suction force may increase in the order of the first mode 4 the second mode 4 the third mode. In more detail, the first mode may be a quiet mode, the second mode may be a normal mode, and the third mode may be a turbo mode.

The input portion 161 may include a push switch to generate an input signal by detecting user pressurization, a membrane switch, or a touch switch to generate an input signal by detecting contact of some parts of a user's body.

Although not shown in the drawings, the input portion 161 may further include a remote controller capable of remotely controlling the robot cleaner 100.

The display portion 162 may be implemented as a display panel, for example, a liquid crystal display (LCD), a light emitting diode (LED) display, an organic light emitting diode (OLED) display, or the like. In addition, each of the display portion 162 and the input portion 161 may also function as a touchscreen as necessary.

Based on the user control command and the detection result or output value of the sensing portion 140, the controller 110 may control the traveling portion 120 and the cleaning portion 130. A detailed control operation of the controller 110 will be described later.

The controller 110 may include an input/output (I/O) interface 114 to perform mediation of data communication between the controller 110 and various constituent elements contained in the robot cleaner 100, a memory 113 to store a program and data therein, a graphics processor 112 to perform image processing, a main processor 111 to perform a calculation operation according to the program and data stored in the memory 113, and a system bus 115 used as a data communication path among the I/O interface 114, the memory 113, the graphics processor 112, and the main processor 111.

The I/O interface 114 may receive the detection result of the sensing portion 140, i.e., the output value of the sensing portion 140. The I/O interface 114 may transmit the received detection result or output value of the sensing portion 140 to the main processor 111, the graphics processor 112, and the memory 113.

In addition, the I/O interface 114 may transmit a control signal generated from the main processor 111 to the traveling portion 120 and the cleaning portion 130.

The memory 113 may retrieve a control program and data needed to control the operation of the robot cleaner 100 from the storage portion 150 and store the retrieved control program and data, or may temporarily store the detection result of the sensing portion 140 or the like.

The memory 113 may include volatile memories such as SRAM, DRAM, or the like. However, the scope or spirit of the present invention is not limited thereto. If necessary, the memory 113 may include non-volatile memories, for example, a flash memory, an Erasable Programmable Read Only Memory (EPROM), etc.

The graphic processor 112 may convert an image acquired from the image sensor 142 into a format capable of being stored in the memory 113 or the storage portion 150, or may change a resolution or size of the image acquired from the image sensor 142.

The main processor 111 may process the detection result of the sensing portion 140 according to the program and data stored in the memory 113, or may perform the calculation operation for controlling the traveling portion 120 and the cleaning unit 130.

For example, the main processor 111 may detect a floor state according to the detection result of the sensing portion 140, and may generate a control signal for controlling the suction force of the suction module 132 on the basis of the detected floor state.

The main processor 111 may calculate the position of the robot cleaner 100 on the basis of the image obtained from the image sensor 142, or may calculate the direction, distance, and size of the obstacle on the basis of the output value of the obstacle sensor 141.

In addition, the main processor 111 may perform operations needed to determine whether the obstacle will be avoided according to the direction, distance, and size of the obstacle or to determine whether the robot cleaner 100 will contact the obstacle. If it is expected that the robot cleaner 100 will avoid the obstacle, the main processor 111 may calculate the traveling route for avoiding the obstacle. If it is expected that the robot cleaner 100 will contact the obstacle, the main processor 111 may calculate the traveling route for arranging the obstacle and the robot cleaner 100.

The main processor 111 may generate a control signal to be provided to the traveling portion 120 in such a manner that the robot cleaner 100 may move along the calculated traveling route.

The storage portion 150 may include a non-volatile memory, for example, a magnetic disk, a Solid State Drive (SSD), a Read Only Memory (ROM), an Erasable Programmable Read Only Memory (EPROM), an Electrically Erasable Programmable Read Only Memory (EEPROM), etc. If necessary, the storage portion 150 may further include the above-mentioned volatile memory.

The storage portion 150 may permanently store the control program and data needed to control the operation of the robot cleaner 100, and may also store a cleaning map generated based on the image acquired by the image sensor 142.

FIG. 6 is a conceptual diagram illustrating a method for allowing the robot cleaner to control the suction force according to floor states according to an embodiment of the present disclosure.

As described above, the controller 110 may control the suction module 132 to have different suction forces according to floor states. For example, when the floor state is the soft floor, the controller 110 may control the suction module 132 to have a higher suction force as compared to the other case in which the floor state is the hard floor. In more detail, as shown in FIG. 6, when the floor state is the soft floor, the controller 110 may control the suction module 132 to have the suction force of 70%. When the floor state is the hard floor, the controller 110 may control the suction module 132 to have the suction force of 20%. In addition, when the floor state is a dusty floor state, the controller 110 may control the suction module 132 to have the suction force of 100%.

In this case, a reference for indicating the suction force may be a maximum output level of the suction motor 132a.

For example, assuming that the maximum output level of the suction motor 132a is 70 watts(W), when the floor state is the soft floor, the suction module 132 may suction dust at the output level of 49 W. Assuming that the maximum output level of the suction motor 132a is 70 watts(W), when the floor state is the hard floor, the suction module 132 may suction dust at the output level of 14 W. Assuming that the maximum output level of the suction motor 132a is 70 watts(W), when the floor state is a dusty floor, the suction module 132 may suction dust at the maximum output level of 70 W.

However, the suction forces of the respective floor states shown in FIG. 6 are only an example capable of being applied to the robot cleaner 100, and the scope or spirit of the robot cleaner 100 is not limited thereto.

The suction force for each floor state may be established in advance. After the suction force for each floor state has been established, the suction force for each floor state may also be changed by the user as necessary.

Meanwhile, the controller 110 may also control not only the suction force of the suction module 132 but also the traveling route of the robot cleaner 100 on the basis of the floor states. A detailed description thereof will hereinafter be given with reference to the attached drawings.

FIGS. 7 to 9 are views illustrating various examples for allowing the robot cleaner to control a traveling route according to floor states according to an embodiment of the present disclosure. FIG. 7 is a conceptual diagram illustrating a priority cleaning mode for the soft floor, FIG. 8 is a conceptual diagram illustrating a repeated cleaning mode for the soft floor, and FIG. 9 is a conceptual diagram illustrating an omitted cleaning mode for the soft floor.

In FIGS. 7 to 9, it is assumed that the robot cleaner 100 performs cleaning and traveling according to the automatic cleaning mode.

Referring to FIG. 7, when the controller 110 determines the floor state to be the soft floor (SF) while cleaning and traveling about a cleaning region R, the controller 110 may control the traveling route of the robot cleaner 100 to perform priority cleaning of a region corresponding to the soft floor (SF).

To this end, the controller 110 may determine the floor state in real time or at intervals of a predetermined time.

In more detail, when the robot cleaner 100 travels over (or crosses) a border B between the region corresponding to the hard floor and the region corresponding to the soft floor while cleaning and traveling about the hard floor region, the controller 110 may determine that the floor state is changed from the hard floor to the soft floor.

The controller 110 may control the suction force of the suction module 132 to have suction force corresponding to the soft floor. In more detail, the controller 110 may increase the suction force of the suction module 132 by increasing the output of the suction motor 132a.

When the robot cleaner 100 travels over (or crosses) the border B between the hard floor region and the soft floor region while cleaning and traveling about the soft floor region, the controller 110 may determine that the floor state is changed from the soft floor to the hard floor.

In this case, the controller 110 may control the traveling direction of the robot cleaner 100 to rotate by 180°, such that the robot cleaner 100 may re-enter the soft floor region. In more detail, the controller 110 may control the traveling direction by transmitting a control signal to the traveling portion 120.

As described above, when the robot cleaner 100 moves from the soft floor region to the hard floor region, the controller 110 may detect such movement toward the hard floor region and then control the robot cleaner 100 to re-enter the soft floor region, such that the controller 110 may control the robot cleaner 100 to perform priority cleaning of the soft floor region by repeating the above movement detection and re-entry to the soft floor region.

When the priority cleaning of the soft floor region is completed, the controller 110 may clean the remaining hard floor region from among the entire cleaning region R. When the robot cleaner re-enters the hard floor region after completion of the priority cleaning of the soft floor region, the controller 110 may again reduce the suction force of the suction module 132.

During the cleaning and traveling mode of the robot cleaner 100, the image sensor 142 may acquire an image of the cleaning region R to be cleaned, and the controller 110 may generate a cleaning map on the basis of the acquired image. The generated cleaning map may be stored in the storage portion 150.

Alternatively, as shown in FIG. 8, when the controller 110 determines the floor state to be the soft floor while the robot cleaner 100 cleans and travels about the cleaning region R, the controller 110 may repeatedly clean the soft floor region after completion of the cleaning and traveling operation along an original traveling route.

The controller 110 may control the suction module 132 to generate the suction force corresponding to the hard floor about the entire cleaning region R. When the robot cleaner 100 cleans the hard floor region while cleaning and traveling about the entire cleaning region R, the controller 110 may control the suction module 132 to generate the suction force corresponding to the hard floor. When the robot cleaner 100 cleans the soft floor region, the controller 110 may control the suction module 132 to generate the suction force corresponding to the soft floor.

As described in the above-mentioned example, during the cleaning and traveling operation of the robot cleaner 100, the image sensor 142 may acquire an image of the entire cleaning region R, and the controller 110 may generate a cleaning map on the basis of the acquired image. The generated cleaning map may be stored in the storage portion 150, and the cleaning map may include information regarding the floor state of the cleaning region R.

Upon completion of the cleaning and traveling operation about the entire cleaning region R, the controller 110 may control the robot cleaner 100 to re-enter the soft floor region by controlling the traveling portion 120. In this case, the controller 110 may use the cleaning map stored in the storage portion 150. When the robot cleaner 100 enters the soft floor region, the controller 110 may control the suction module 132 to generate the suction force corresponding to the soft floor.

As shown in FIG. 8, the robot cleaner 100 may repeatedly clean the soft floor region having a high resistance in suction of dust or foreign substances, thereby increasing cleaning efficiency.

Alternatively, as shown in FIG. 9, when the controller 110 determines the floor state to be the soft floor while the robot cleaner 100 cleans and travels about the cleaning region R, the controller 110 may perform omitted cleaning in which the soft floor region is omitted from the entire cleaning region R and thus the robot cleaner 100 cleans only the remaining region other than the soft floor region.

When the robot cleaner 100 enters the soft floor region by crossing the border B between the hard floor region and the soft floor region while cleaning and traveling about the hard floor region, the controller 110 may determine that the floor state is changed from the hard floor to the soft floor.

In this case, the controller 110 may rotate the traveling direction of the robot cleaner 100 by 180°, such that the robot cleaner 100 may re-enter the hard floor region. In more detail, the controller 110 may control the traveling direction of the robot cleaner 100 by transmitting a control signal to the traveling portion 120.

As described above, when the robot cleaner 100 moves from the hard floor region to the soft floor region, the controller 110 may detect such movement toward the soft floor region and then control the robot cleaner 100 to re-enter the hard floor region, such that the controller 110 may omit cleaning of the soft floor region by repeating the above movement detection and re-entry to the hard floor region.

Since the soft floor region is not cleaned by the robot cleaner 100, the suction module 132 may be controlled by the suction force corresponding to the hard floor.

As illustrated in the example of FIG. 9, the robot cleaner 100 omits the soft floor region from the entire cleaning region to be cleaned, quickly cleans only the hard floor region using a low suction force, and directs the user to manually clean the soft floor region, such that a battery lifetime of the robot cleaner 100 may increase and the robot cleaner 100 may perform efficient cleaning about the cleaning region to be cleaned.

FIG. 10 is a conceptual diagram illustrating a method for allowing the robot cleaner to control an exemplary case in which the robot cleaner detects a fall. FIG. 11 is a conceptual diagram illustrating a method for allowing the robot cleaner to control an exemplary case in which the environment stored in the cleaning map is changed.

The sensing portion 140 may further include a fall prevention sensor (not shown) configured to prevent the robot cleaner 100 from falling during traveling of the robot cleaner 100. As one example of the fall prevention sensor, an infrared sensor may be used. The fall prevention sensor may emit infrared light to the floor surface, and may receive the infrared light reflected from the floor surface, such that the fall prevention sensor may detect the distance to the floor surface.

If the detected distance is equal to or longer than a predetermined distance, the controller 110 may determine the presence of a high possibility of falling of the robot cleaner 100 as shown in FIG. 10, such that the controller 110 may transmit a fall sensing signal for indicating a high risk of falling of the robot cleaner 100 to the controller 110, and the controller 110 may move the main body 101 in a backward direction such that the controller 110 may prevent the robot cleaner 100 from falling.

In this case, the controller 110 may control the robot cleaner 100 to move by different backward movement distances according to various states of the floor surface on which the robot cleaner 100 travels. In more detail, when the floor state is the soft floor, the controller 110 may increase the backward movement distance of the robot cleaner 100 as compared to the other case in which the floor state is the hard floor. For example, when the floor state is the hard floor and a high risk of falling of the robot cleaner 100 is detected, the controller 110 may control the robot cleaner 100 to move backward by 3 cm. When the floor state is the soft floor and a high risk of falling of the robot cleaner 100 is detected, the controller 110 may control the robot cleaner 100 to move backward by 5 cm.

As a result, although slip of the traveling wheel 122 occurs in the soft floor environment, the robot cleaner 100 may safely move backward.

Referring to FIG. 11, when the robot cleaner 100 finishes cleaning of the cleaning region R, the robot cleaner 100 returns to a docking station 400 and is then charged with electricity through the docking station 400. Thereafter, when the robot cleaner 100 performs re-cleaning of the soft floor region on the basis of the cleaning map, if the position stored as the soft floor region in the cleaning map does not correspond to the soft floor region, the robot cleaner 100 may again return to the docking station 400 without cleaning the soft floor region or may clean the entirety of the cleaning region R.

In more detail, after the robot cleaner 100 finishes cleaning of the cleaning region R, the user may intentionally move the carpet to the outside of the cleaning region R. In this case, when the robot cleaner 100 arrives at the position stored as the soft floor region in the cleaning map, the sensing portion 140 may detect the floor state. When the detected floor state is not identical to the soft floor, the robot cleaner 100 may again return to the docking station 400, or may return to the docking station 400 after finishing cleaning of the entire cleaning region R. When the detected floor state is the soft floor, the robot cleaner 100 may clean the corresponding region.

As described above, after the entire cleaning region R is completely cleaned, the robot cleaner 100 returns to the docking station 400 and is then charged with electricity. Whereas a conventional robot cleaner has been designed to perform re-cleaning of the cleaning region after an internal battery thereof is fully charged with electricity, the robot cleaner 100 according to the embodiment may move to the cleaning region R as soon as an internal battery thereof is charged with as much electricity as it needs and may thus perform re-cleaning of the cleaning region R.

To this end, the controller 110 may calculate a charging ratio needed to clean the cleaning region R on the basis of the cleaning map stored in the storage portion 150. In more detail, the cleaning map may include information regarding the ratio of the soft floor region to the cleaning region R and information regarding the ratio of the hard floor region to the cleaning region R. The controller 110 may calculate the charging ratio needed to clean the cleaning region R using the suction force corresponding to the soft floor region, the suction force corresponding to the hard floor region, and the ratio of two regions (i.e., the soft floor region and the hard floor region). For example, under the condition that the calculation result indicates the charging ratio of 70%, although the robot cleaner 100 having returned to the docking station 400 is charged with electricity of 70% to 75%, the controller 110 may control the robot cleaner 100 to move back to the cleaning region R such that the robot cleaner 100 may perform re-cleaning of the cleaning region R.

FIG. 12 is a conceptual diagram illustrating a method for allowing the robot cleaner to move according to a point cleaning operation according to an embodiment of the present disclosure. FIG. 13 is a conceptual diagram illustrating a traveling route used in an exemplary case in which the robot cleaner detects a soft floor while in motion according to the point cleaning operation.

As described above, the input portion 161 of the robot cleaner 100 may include a remote controller 200.

Referring to FIG. 12, the remote controller 200 may include an input portion 210 to receive a control command from the user, and an emitting portion 220 to emit visible light and infrared light according to the user control command.

The visible light emitted from the emitting portion 220 may form a light spot (LS) at a user-designated position, such that feedback information regarding the user-designated position is supplied to the user. The infrared light emitted from the emitting portion 220 may transmit the user-designation position information and the user control command to the robot cleaner 100.

The robot cleaner 100 may include a light reception portion (not shown) configured to receive the infrared light emitted from the emitting portion 220 of the remote controller 200, and the controller 110 may control the robot cleaner 100 to travel along a movement route of the light spot (LS) on the basis of the infrared light received by the light reception portion.

Referring to FIG. 13, when the robot cleaner 100 enters the soft floor region while moving along the light spot (LS) so as to perform point cleaning, the robot cleaner 100 performs priority cleaning about the soft floor region and then again returns to the movement route of the light spot (LS).

When the robot cleaner 100 enters the soft floor region, the controller 110 may control the suction module 132 to generate the suction force corresponding to the soft floor. In addition, when the robot cleaner 100 re-enters the hard floor region, the controller 110 may control the suction module 132 to generate the suction force corresponding to the hard floor.

FIG. 14 is a conceptual diagram illustrating an exemplary case in which the robot cleaner performs cleaning and traveling while simultaneously tracing a wall surface according to an embodiment of the present disclosure. FIG. 15 is a conceptual diagram illustrating a method for allowing the robot cleaner to control suction force according to a floor state and information as to whether a wall surface is traced according to an embodiment of the present disclosure.

Referring to FIG. 14, the robot cleaner 100 may perform the cleaning traveling mode while simultaneously tracing the wall surface W. In more detail, when the robot cleaner 100 detects the wall surface W during the cleaning traveling mode of the robot cleaner 100, the robot cleaner 100 may perform cleaning while simultaneously traveling along the detected wall surface W.

When the robot cleaner 100 moves from the hard floor region to the soft floor region during the cleaning traveling mode based on the wall tracing manner, the controller 110 may detect entry to the soft floor region and may control the suction module 132 to have the suction force corresponding to the wall surface and the soft floor as shown in FIG. 15. In other words, when the robot cleaner 100 cleans and travels about the soft floor region while simultaneously tracing the wall surface, the controller 110 may control the suction module 132 to have a third-level suction force. Assuming that the suction force corresponding to the soft floor is referred to as a second-level suction force and the suction force corresponding to the hard floor is referred to as a first-level suction force, the suction forces of the first to third levels may be denoted by "first-level suction force<second-level suction force<third-level suction force". For example, the third-level suction force may be set to the suction force of 100%.

When the robot cleaner 100 enters the soft floor region while simultaneously tracing the wall surface as shown in FIGS. 14 and 15, the suction force of the robot cleaner 100 increases to maximum suction force such that the wall surface W and the floor are brought into contact with each other, resulting in increased cleaning efficiency in the soft floor region.

FIG. 16 is a view illustrating a blade structure of the robot cleaner according to an embodiment of the present disclosure.

Referring to FIG. 16, the suction inlet 103 may be provided with a blade 107 for directing the dust scattered by the brush 131b into the dust box 105. The blade 107 may be arranged at the rear of the brush 131b, and may be formed of a flexible material such as rubber.

The blade 107 may be tilted downward toward the floor, such that the end of the blade 107 may be in close contact with the floor surface during downward movement of the blade 107 and may be released from close contact with the floor surface during upward movement of the blade 107.

A motor (not shown) configured to provide drive power through which the blade 107 moves upward or downward, and the controller 110 may transmit a control signal to the motor in such a manner that the blade 107 moves upward or downward.

When the controller 110 determines the floor state to be the soft floor during the cleaning traveling mode of the robot cleaner 100, the controller 110 may improve suction efficiency by moving the blade 107 downward.

In addition, the controller 110 may control the suction module 132 to have the suction force corresponding to the soft floor.

Meanwhile, since lint or nap easily occurs in the soft floor region and dust readily accumulates between carpet yarns in the soft floor region, a relatively large amount of dust may generally occur in the soft floor region during the cleaning traveling mode of the robot cleaner 100 as compared to the hard floor region. Therefore, after completion of the cleaning about the cleaning region R, when the ratio of the soft floor region to the cleaning region R is equal to or higher than a predetermined reference, the controller 110 may output an instruction signal for guiding the user to empty the dust box 105. For example, the instruction signal may be output through the display portion 162.

FIGS. 17 to 19 are conceptual diagrams illustrating examples in which the robot cleaner informs the user of soft floor detection according to an embodiment of the present disclosure.

The robot cleaner 100 may visually display detection of the soft floor. The detection of the soft floor may indicate execution of high-suction-force cleaning. For example, as shown in FIG. 17, in order to indicate the detection state of the soft floor, a bar-shaped symbol may be displayed as a bold bar on the display portion 162. In another example, as shown in FIG. 18, visible light may be projected onto the floor so as to indicate the detection state of the soft floor. In another example, as shown in FIG. 19, a light source 172 mounted to a top surface of the robot cleaner 100 may be driven to indicate the detection state of the soft floor.

In order to project the visible light onto the floor, an electromagnetic emitting portion 141a of the obstacle sensor 141 may be used. In another example, an additional light source 171 mounted to a lower part of the robot cleaner 100 may also be used as shown in FIG. 18. For example, the light sources 171 and 172 may be implemented as LEDs.

In addition, the detection state of the soft floor may also be audibly indicated through a speaker (not shown) mounted to the robot cleaner 100.

The user may recognize a current suction force of the robot cleaner through the above visual or audible information, and may also recognize whether or not the robot cleaner 100 normally operates. As a result, the user may take appropriate measures for efficient cleaning.

For example, when information regarding the detection state of the soft floor is not supplied to the user even though the robot cleaner 100 enters the carpet region, the user may recognize the fact that the robot cleaner 100 has not detected the presence of the carpet, such that the user may directly clean the carpet region without using the robot cleaner 100 as necessary.

The above-mentioned embodiments have exemplarily disclosed that the robot cleaner 100 controls the suction force and the traveling route according to a state of the floor to be cleaned by the robot cleaner 100. A method for allowing the robot cleaner 100 to recognize the floor state according to the embodiment of the present disclosure will hereinafter be described in detail.

Referring back to FIG. 3, the sensing portion 140 may include a wheel sensor 143 to detect load applied to the traveling wheel 122.

When load is applied to the traveling wheel 122, the RPM of the wheel motor 121 increases, such that the wheel sensor 143 may be implemented as an encoder configured to measure the motor RPM.

In addition, the wheel sensor 143 may include a left wheel sensor mounted to the left wheel motor 121a so as to independently detect the RPM of the left wheel motor 121a, and a right wheel sensor mounted to the right wheel motor 121b so as to independently detect the RPM of the right wheel motor 121b.

The controller 110 may recognize the floor state on the basis of load applied to the traveling wheel 122. For example, when the load applied to the traveling wheel 122 is equal to or higher than a predetermined reference value, the controller 110 may determine the floor state to be the soft floor. When the load applied to the traveling wheel 122 is less than the predetermined reference value, the controller 110 may determine the floor state to be the hard floor.

FIG. 20 is a graph illustrating the relationship between an encoder output and a duty ratio according to floor states.

Referring to FIG. 20, when load is applied to the traveling wheel 122 according to the floor state, the RPM of the wheel motor 121 may be reduced and a duty ratio of the wheel motor 121 may be increased by Proportional Integral Derivative (PID) control. That is, when the floor state is the soft floor and the load applied to the traveling wheel 122 increases, the encoder output may be reduced and the duty ratio may be increased.

The relationship between the encoder output and the duty ratio may be denoted by a gradient (g) of the graph shown in FIG. 20. When the gradient (g) is equal to or higher than a predetermined reference value ($Th_1$), the controller 110 may determine the floor state to be the hard floor. When the gradient (g) is less than the predetermined reference value ($Th_1$), the controller 110 may determine the floor state to be the soft floor.

Meanwhile, in order to reflect a weight-based linear velocity, the gradient variation ($\Delta g$) may be calculated by the following equation 1. A difference ($\Delta Diff.$) between a measurement value and a calculated value may be calculated by the following equation 2.

$$\Delta g = g * \Delta w \qquad \text{Equation 1}$$

In Equation 1, 'g' may be denoted by "g=Encoder Output/Duty Ratio", and '$\Delta w$' may be a weight based on the linear velocity and be allocated by a developer.

$$\Delta Diff. = E - \Delta g \qquad \text{Equation 2}$$

In Equation 2, E may denote the encoder output.

FIG. 21 is a graph illustrating encoder outputs and calculation values of the controller when the floor state is the hard floor. FIG. 22 is a graph illustrating encoder outputs and calculation values of the controller when the floor state is a soft floor.

When the floor state is a smooth hard floor such as a wooden floor or a tiled floor, the encoder output (E), the gradient variation (Δg), and the difference (ΔDiff.) between the encoder output (E) and the gradient variation (Δg) are as shown in the graph of FIG. 21.

When the floor state is the soft floor such as a carpet, the encoder output (E), the gradient variation (Δg), and the difference (ΔDiff.) between the encoder output (E) and the gradient variation (Δg) are as shown in the graph of FIG. 22.

The controller 110 may recognize the floor state by comparing a predetermined reference value ($Th_2$) with the difference (ΔDiff.). Referring to FIGS. 21 and 22, when the difference (ΔDiff.) is equal to or higher than the reference value ($Th_2$), the controller 110 may determine the floor state to be the soft floor. When the difference (ΔDiff.) is less than the reference value ($Th_2$), the controller 110 may determine the floor state to be the hard floor.

In this case, the reference value ($Th_2$) may be predetermined through experiments or simulations.

Meanwhile, the controller 110 may further reflect the duty ratio variation caused by reduction of a battery voltage as necessary, and a detailed description thereof will hereinafter be given with reference to FIGS. 23 and 24.

FIG. 23 is a graph illustrating floor states and duty ratios for each battery voltage. FIG. 24 is a graph illustrating a deviation between the duty ratios for each battery voltage.

Referring to FIG. 23, when a battery voltage (v) for supplying a power-supply voltage to the robot cleaner 100 is reduced, the duty ratio (d) may be increased to compensate for the reduced battery voltage. In addition, as described above, as the load applied to the traveling wheel 122 gradually increases according to the floor state, the duty ratio (d) may also increase.

If a deviation (Δd) of the duty ratios of the respective battery voltages is denoted by a quadratic equation, the resultant graph shown in FIG. 24 may be obtained. The controller 110 may calculate the deviation (Δd) of the duty ratios based on battery voltages, and may use an expression "d−Δd" as the duty ratio needed to calculate Equation 1 and Equation 2.

FIG. 25 is a conceptual diagram illustrating an exemplary case in which the robot cleaner is located at a border between the soft floor region and the hard floor region according to an embodiment of the present disclosure.

Meanwhile, the controller 110 may apply the above calculation and decision process to each of the left traveling wheel 122a and the right traveling wheel 122b. When the decision results of the left traveling wheel 122a and the right traveling wheel 122b indicate the soft floor, the controller 110 may determine that two traveling wheels 122a and 122b of the robot cleaner 100 are located in the soft floor region. When the decision results of the left traveling wheel 122a and the right traveling wheel 122b indicate the hard floor, the controller 110 may determine that two traveling wheels 122a and 122b of the robot cleaner 100 are located in the hard floor region.

However, as shown in FIG. 25, it should be noted that one 122a of the two traveling wheels 122a and 122b may be located in the soft floor region and the other one 122b may be located in the hard floor region without departing from the scope or spirit of the present disclosure. As described above, the controller 110 may independently apply the above calculation and decision process to each of the two traveling wheels 122a and 122b, such that the controller 110 is able to perform correct decision even when the two traveling wheels 122a and 122b are located in different regions.

If necessary, the controller 110 may combine the decision result based on the load applied to the traveling wheel 122 with the decision result based on the load applied to the brush 131b, such that the controller 110 may also obtain the final decision in a complementary manner A detailed description thereof will hereinafter be given with reference to FIGS. 26 to 29.

FIG. 26 is a control block diagram illustrating a robot cleaner further including a current sensor. FIG. 27 is a graph illustrating an exemplary current measured by a current sensor.

Referring to FIG. 26, the robot cleaner 100 according to one embodiment may further include a current sensor 144 configured to measure a current of the brush motor 131a.

When the floor state is the soft floor, load is applied not only to the traveling wheel 122 but also to the brush 131b. When the load is applied to the brush 131b, a current flowing in the motor 131a may increase.

Therefore, the controller 110 may recognize the floor state by comparing the current measured by the current sensor 144 with a predetermined reference value ($Th_3$). As shown in FIG. 27, when the current measured by the current sensor 144 is equal to or higher than a predetermined reference value ($Th_3$), the controller 110 may determine the floor state to be the soft floor. When the current measured by the current sensor 144 is less than the predetermined reference value ($Th_3$), the controller 110 may determine the floor state to be the hard floor.

In this case, the reference value ($Th_3$) may be predetermined through experiments or simulations.

FIG. 28 is a graph illustrating an exemplary current measured for each floor state.

Referring to FIG. 28, although the floor states are actually different from each other, the current values measured by the current sensor 144 on the different floor states may unexpectedly overlap with each other such that it may be difficult to discriminate among the measurement current values due to overlapping of the current values. For example, when the brush 131b is spaced apart from the floor surface due to pitching of the robot cleaner 100, it may be impossible to measure a correct current in which the floor state is reflected.

In more detail, when the robot cleaner 100 travels over the obstacle 5 such as a threshold, the brush 131b mounted to the bottom of the front part of the robot cleaner 100 may be floated on the floor. Therefore, erroneous information may be included in the floor-state decision result based on the load applied to the brush 131b.

In another example, when the carpet spread on the floor is formed in a cut pile shape and the length of yarn is in the range of 3 mm to 7 mm, both traveling wheels 122a and 122b are affected by carpet yarns and are located at different heights with respect to the floor surface, or when the carpet yarns are pressed down and squashed in the traveling direction of the robot cleaner 100 and rotate in the same direction as the traveling direction, erroneous information may be included in the floor-state decision result based on the load applied to the brush 131b, but the other decision result based on the load applied to the traveling wheel 122 may be considered reliable.

In contrast, erroneous information may be contained in the decision result based on the load applied to the traveling wheel 122, and the other decision result based on the load applied to the brush 131*b* may be considered reliable as necessary.

For example, if the carpet spread on the floor is formed in a loop pile shape, there is a possibility that erroneous information may be contained in the decision result based on the load applied to the traveling wheel 122.

When at least one of the decision result based on the load applied to the traveling wheel 122 and the other decision result based on the load applied to the brush 131*b* indicates the soft floor, the controller 110 may finally determine the floor state to be the soft floor.

In other words, when at least one of the load applied to the traveling wheel 122 and the other load applied to the brush 131*b* is equal to or higher than the corresponding reference value (first reference value or second reference value), the controller 110 may determine the floor state to be the soft floor.

FIG. 29 is a control block diagram illustrating a robot cleaner further including an acceleration sensor.

Referring to FIG. 29, the sensing portion 140 of the robot cleaner 100 may further include an acceleration sensor 145 configured to measure acceleration of the main body 101. The acceleration sensor 145 may measure acceleration (dx) associated with an X-axis corresponding to a forward direction of the main body 101 and acceleration (dz) associated with a Z-axis corresponding to a height direction of the main body 101.

The controller 110 may monitor the output of the acceleration sensor 145 in real time. If the acceleration parameters dx and dz are abruptly increased, the controller 110 may determine that the robot cleaner 100 quickly starts operation or suddenly stops operation.

After the acceleration parameters dx and dz are abruptly increased and then reduced, if the acceleration parameters dx and dz are abruptly re-increased at intervals of a predetermined time, the controller 110 may determine that the robot cleaner 100 travels over the obstacle such as a threshold and then moves down.

For example, when the robot cleaner 100 travels over the obstacle, load similar to a load generated when the robot cleaner 100 moves from the hard floor region to the soft floor region may be applied to the traveling wheel 122. Therefore, there is a possibility that the decision result based on the load applied to the traveling wheel 122 has difficulty in discriminating between the first case in which the robot cleaner 100 travels over the obstacle and the second case in which the robot cleaner 100 moves from the hard floor region to the soft floor region.

However, the output signals of the acceleration sensor having detected the above two cases may indicate different results, such that the controller 110 may filter out the first case in which the robot cleaner 100 travels over the obstacle on the basis of the output signal of the acceleration sensor 145.

In more detail, when the X-axis directional acceleration and the Z-axis directional acceleration are abruptly increased, the controller 110 determines that the robot cleaner 100 travels over the obstacle such that the controller 110 turns off the wheel sensor 143. Alternatively, although the decision result based on the output of the wheel sensor 143 indicates the soft floor, the controller 110 may not perform the suction force control and traveling route control corresponding to the soft floor.

In addition, the controller 110 may apply the output of the wheel sensor 143 to the suction force control only when the robot cleaner 100 has a traveling speed equal to or higher than a predetermined speed, the sensed result or the suction force control may have higher reliability. For example, the predetermined speed may be 200 mm/s. In more detail, only when the traveling speed of the robot cleaner 100 is equal to or higher than a predetermined reference speed, the controller 110 may detect load applied to the traveling wheel 122 using the wheel sensor 143, and may apply the detected load to the suction force control. When the traveling speed of the robot cleaner 100 is less than the reference speed, the controller 110 may detect load applied to the brush 131*b* and apply the detected load to the suction force control, or may not perform the suction force control as necessary.

If the robot cleaner 100 rotates clockwise or counterclockwise to change the traveling direction or if the robot cleaner 100 remains stationary at one place, the controller 110 may not change the suction force of the suction module 132 to another suction force. In more detail, when the position of the robot cleaner 100 is not changed during rotation of the traveling wheel 122, the wheel sensor 143 may detect no load or may not use the detection result of the wheel sensor 133, such that the suction force generated by the suction module 132 may remain unchanged. As a result, although erroneous information occurs in the load detection result of the traveling wheel 122 rotating clockwise or counterclockwise at one place, the controller 110 may prevent erroneous information from occurring in the suction force control.

FIG. 30 is a conceptual diagram illustrating a method for allowing the robot cleaner to control an exemplary case in which a border region between the soft floor region and the hard floor region is short in length.

Referring to FIG. 30, before the robot cleaner moves by a predetermined distance after entering the hard floor region by traveling over the border B between the soft floor region (SF) and the hard floor region (HF), the robot cleaner 100 is bumped against the wall or obstacle (O) and is thus unable to move forward any more, the controller 110 may control the suction module 132 to have the suction force corresponding to the soft floor.

In more detail, assuming that the spacing between the border B of the two regions and the wall or obstacle in the traveling direction of the robot cleaner 100 is referred to as a border section, when the distance (d) to the border section is shorter than a predetermined distance, the controller 110 may not perform the suction force control according to change of the floor state, and may control the suction module 132 to have the suction force corresponding to the previous region.

Although FIG. 30 has exemplarily disclosed that the robot cleaner 100 moves from the soft floor region to the hard floor region for convenience of description, it should be noted that the robot cleaner 100 may also move from the hard floor region to the soft floor region as necessary.

As a result, the robot cleaner 100 may apply the suction force control only to the detection result obtained when the robot cleaner 100 travels by the predetermined distance or longer, resulting in increased reliability in the detection result.

The robot cleaner 100 according to one embodiment may determine the floor state by combining the load applied to the traveling wheel 122, the load applied to the brush 131*b*, and the acceleration of the main body 101 with one another in a complementary manner, such that the robot cleaner 100 may increase accuracy in the detection result. The robot cleaner 100 controls battery power to be efficiently consumed by controlling the suction force according to the floor states, resulting in a maximum battery lifespan. The robot cleaner 100 controls the traveling route control according to the floor states, resulting in increased cleaning efficiency.

A method for controlling the robot cleaner according to one embodiment will hereinafter be described. The above-mentioned robot cleaner 100 may be applied to the following method for controlling the robot cleaner. Therefore, the above-mentioned explanation and drawings may also be equally applied to the following method for controlling the robot cleaner.

FIG. 31 is a flowchart illustrating a method for controlling the robot cleaner according to an embodiment of the present disclosure.

Referring to FIG. 31, the method for controlling the robot cleaner according to one embodiment may recognize the floor state on the basis of the sensed result of the sensing portion 140 (312). The floor state may include a soft floor state and a hard floor state. The soft floor may refer to a floor covered with rough fabrics, such as a carpet, having higher resistance against slippage. The hard floor may refer to a smooth and hard floor such as a wooden floor, a tiled floor, etc. The floor state may be recognized by the controller 110, and it is assumed that the robot cleaner 100 performs the cleaning traveling mode while simultaneously traveling on the floor.

The robot cleaner 100 may control the suction force and the traveling route on the basis of the detected floor state (312). For example, when the floor state is the soft floor, the suction force corresponding to the soft floor may be predetermined. When the floor state is the hard floor, the suction force corresponding to the hard floor may be predetermined. The suction force corresponding to the soft floor may be higher than the suction force corresponding to the hard floor. The reason why the robot cleaner 100 controls the traveling route is to perform efficient cleaning according to the floor state.

Meanwhile, detection of the floor state and the control process based on the detected floor state may be performed in real time during the cleaning traveling mode of the robot cleaner or may also be performed at intervals of a predetermined time during the cleaning traveling mode of the robot cleaner. For convenience of description and better understanding of the present disclosure, it is assumed that each of the flowchart of FIG. 27 and the following flowchart to be described later will exemplarily disclose one cycle in which the floor state decision and the control process based on the detected floor state are performed. A method for controlling the traveling route will hereinafter be described.

FIG. 32 is a flowchart illustrating a method for allowing the robot cleaner to perform priority cleaning of the soft floor according to an embodiment of the present disclosure. FIG. 33 is a flowchart illustrating a method for allowing the robot cleaner to perform repeated cleaning of the soft floor according to an embodiment of the present disclosure. FIG. 34 is a flowchart illustrating a method for allowing the robot cleaner to omit cleaning of the soft floor according to an embodiment of the present disclosure. As illustrated in FIGS. 32 to 34, it is basically assumed that the robot cleaner 100 cleans and travels about the hard floor region.

Referring to FIG. 32, the robot cleaner 100 may recognize and detect the floor state on the basis of the detection result of the sensing portion 140 (321).

When the floor state is the soft floor (Yes in 322), the robot cleaner 100 may raise the suction force (323). That is, the robot cleaner 100 may be controlled to have the suction force corresponding to the soft floor.

Simultaneously, the robot cleaner 100 may perform priority cleaning about the soft floor region (324). For example, when the robot cleaner 100 moves from the soft floor region to the hard floor region, the controller 110 may recognize such movement toward the hard floor region, and may control the robot cleaner 100 to re-enter the soft floor region, such that the controller 110 may control the robot cleaner 100 to perform priority cleaning about the soft floor region by repeating the above movement detection and re-entry to the soft floor region.

When the priority cleaning of the soft floor region is completed (Yes in 325), the controller 110 may again reduce the suction force (326), and may clean the remaining hard floor region from among the entire cleaning region R (327).

Referring to FIG. 33, the controller 110 may recognize and detect the floor state (331), and may clean the entire cleaning region R (332). The controller 110 may control the suction module 132 to generate the suction force corresponding to the hard floor in the entire cleaning region R. When the robot cleaner 100 cleans the hard floor region while simultaneously traveling about the entire cleaning region R, the controller 110 may control the suction module 132 to generate the suction force corresponding to the hard floor. When the robot cleaner 100 cleans the soft floor region while simultaneously traveling about the entire cleaning region R, the controller 110 may control the suction module 132 to generate the suction force corresponding to the soft floor.

During the cleaning traveling mode of the robot cleaner 100, the image sensor 142 may acquire an image regarding the cleaning region, and may store a cleaning map generated based on the acquired image in the storage portion 150 (333). The cleaning map may include information regarding the floor state of the cleaning region R.

If the robot cleaner 100 finishes cleaning and traveling about the entire cleaning region R, the robot cleaner 100 may perform repeated cleaning about the region corresponding to the soft floor (334). In more detail, the controller 110 may control the traveling portion 120 such that the robot cleaner 100 may re-enter the soft floor region. When the robot cleaner 100 enters the soft floor region, the controller 110 may control the suction module 132 to generate the suction force corresponding to the soft floor.

Referring to FIG. 33, the robot cleaner 100 may repeatedly clean the soft floor region in which the robot cleaner 100 has difficulty in suctioning dust or foreign substances, resulting in increased cleaning efficiency.

Referring to FIG. 34, the robot cleaner 100 may recognize and detect the floor state on the basis of the detection result of the sensing portion 140 (341).

When the floor state is the soft floor (Yes in 342), the robot cleaner 100 may perform omitted cleaning in which the soft floor region is omitted from the entire cleaning region and thus the robot cleaner 100 cleans only the remaining region other than the soft floor region (343). That is, the robot cleaner 100 may clean only the hard floor region.

For example, when the robot cleaner 100 enters the soft floor region by crossing the border B between the hard floor region and the soft floor region while cleaning and traveling about the hard floor region, the controller 110 may determine that the floor state is changed from the hard floor to the soft floor.

In this case, the controller 110 may rotate the robot cleaner 100 by 180°, such that the robot cleaner 100 may re-enter the hard floor region. In more detail, the controller 110 may control the traveling direction of the robot cleaner 100 by transmitting a control signal to the traveling portion 120.

As described above, when the robot cleaner 100 moves from the hard floor region to the soft floor region, the controller 110 may detect such movement toward the soft floor region and then control the robot cleaner 100 to re-enter the hard floor region, such that the controller 110 may omit cleaning of the soft floor region by repeating the above movement detection and re-entry to the hard floor region.

Referring to FIG. 34, the robot cleaner 100 may quickly clean only the hard floor region using low suction force without cleaning the soft floor region, and may guide the user to manually clean the soft floor region, such that the battery lifetime of the robot cleaner 100 may increase and the robot cleaner 100 may perform efficient cleaning.

FIG. 35 is a flowchart illustrating a method for allowing the robot cleaner to perform the cleaning traveling operation while simultaneously tracing a wall surface according to an embodiment of the present disclosure.

Referring to FIG. 35, the robot cleaner 100 may recognize and detect the floor state on the basis of the detection result of the sensing portion 140 (351). When the floor state is the soft floor (Yes in 352) and the robot cleaner 100 performs cleaning while simultaneously tracing the wall surface (Yes in 353), the robot cleaner 100 may control the suction module 132 to have the third-level suction force (354).

Alternatively, when the floor state is the soft floor (Yes in 352) and the robot cleaner 100 does not trace the wall surface (No in 353), the robot cleaner 100 may control the suction module 132 to have the second-level suction force (355). In this case, the third-level suction force may be higher than the second-level suction force.

FIG. 36 is a flowchart illustrating a method for allowing the robot cleaner to recognize the floor state according to an embodiment of the present disclosure.

Referring to FIG. 36, the robot cleaner 100 may detect load applied to the traveling wheel 122 (361a), and may detect load applied to the brush 131b (361b). The load applied to the traveling wheel 122 may be detected by the wheel sensor 143, and the load applied to the brush 131b may be detected by the current sensor 144 configured to measure the current of the brush motor 131a.

The robot cleaner 100 may detect the floor state on the basis of the load applied to the traveling wheel 122 (362a), and may detect the floor state on the basis of the load applied to the brush 131b (362b).

The operation for detecting the floor state on the basis of the load applied to the traveling wheel 122 may include detecting the floor state on the basis of rpm information of the wheel motor and the duty ratio of the wheel motor. A detailed description thereof is identical to those of the robot cleaner 100 disclosed in the above-mentioned embodiments, and as such a detailed description thereof will herein be omitted for convenience of description.

The operation for detecting the floor state on the basis of the load applied to the brush 131b may include determining whether the current of the brush motor 131a is equal to or higher than a predetermined reference value.

When at least one of two decision results indicates the soft floor (Yes in 363), the robot cleaner 100 may finally determine the floor state to be the soft floor (364), and may thus perform optimum control appropriate for the soft floor. The robot cleaner 100 may perform cleaning using different suction forces according to the floor states, may control the traveling route in different ways according to the floor states, and may visually or audibly inform the user of the detection result of the floor state. In addition, when the floor state is the soft floor, the robot cleaner 100 may control the blade 107 to move down, resulting in increased suction efficiency of dust or foreign substances.

As described above, a related description has sufficiently been discussed in the above "Best Mode" for implementation of the embodiments of the present disclosure. Various embodiments have been described in the best mode for carrying out the invention.

The invention claimed is:
1. A robot cleaner comprising:
a main body;
a wheel configured to move the main body;
a motor configured to provide the wheel with drive power;
a brush module disposed at a lower part of the main body;
a suction module including a suction fan configured to suction dust and a suction motor configured to rotate the suction fan; and
a controller configured to:
determine a floor type based on combining a first decision result based on a load applied to the wheel with a second decision result based on a load applied to the brush module while performing a cleaning traveling mode, and
control a suction force of the suction module according to the determined floor type.

2. The robot cleaner according to claim 1, wherein the controller is further configured to determine the floor type to be a soft floor or a hard floor.

3. The robot cleaner according to claim 2, wherein the controller is further configured to increase the suction force of the suction fan in response to the robot cleaner entering the soft floor from the hard floor.

4. The robot cleaner according to claim 2, wherein the controller is further configured to decrease the suction force of the suction fan in response to the robot cleaner entering the hard floor from the soft floor.

5. The robot cleaner according to claim 2, wherein the soft floor comprises a carpet floor.

6. The robot cleaner according to claim 1, wherein the controller is further configured to compare the load applied to the wheel with a reference value for the first decision result.

7. The robot cleaner according to claim 6, wherein the controller is further configured to determine the first decision result to be a soft floor in response to the load applied to the wheel being equal to or higher than the reference value.

8. The robot cleaner according to claim 6, wherein the controller is further configured to determine the first decision result to be a hard floor in response to the load applied to the wheel being less than the reference value.

9. A robot cleaner comprising:
a main body;
a wheel configured to move the main body;
a wheel motor configured to provide the wheel with drive power; a brush module disposed at a lower part of the main body;
a suction module including a suction fan configured to suction dust and a suction motor configured to rotate the suction fan; and
a controller configured to control a suction force of the suction module based on combining a first decision result based on a load applied to the wheel with a second decision result based on a load applied to the brush module.

10. The robot cleaner according to claim 9, further comprising: a wheel sensor configured to detect the load applied to the wheel.

11. The robot cleaner according to claim 10, wherein:
the wheel sensor is configured to detect rotations per minute (RPM) of the wheel motor, and
the first decision result is based on the RPM of the wheel motor.

12. The robot cleaner according to claim 11, wherein the first decision result corresponds to a hard floor in response to determining the RPM of the wheel motor is less than a reference value.

13. The robot cleaner according to claim 11, wherein the first decision result corresponds to a soft floor in response to determining the RPM of the wheel motor is equal to or greater than a reference value.

14. The robot cleaner according to claim 10, wherein the first decision result is based on a relationship between an RPM of the wheel motor and a duty ratio of the wheel motor.

15. The robot cleaner according to claim 14, wherein the first decision result corresponds to a soft floor in response to determining a gradient of the duty ratio of the wheel motor to the RPM of the wheel motor is less than a reference value.

16. The robot cleaner according to claim 14, wherein the first decision result corresponds to a hard floor in response to determining a gradient of the duty ratio of the wheel motor to the RPM of the wheel motor is equal to or higher than a reference value.

17. The robot cleaner according to claim 10, wherein the first decision result corresponds to a soft floor in response to the load applied to the wheel being equal to or higher than a second reference value.

18. The robot cleaner according to claim 10, wherein the first decision result corresponds to a hard floor in response to the load applied to the wheel being less than a second reference value.

19. The robot cleaner according to claim 9, wherein the controller is further configured to:
determine a floor type to be a soft floor in response to the first decision result or the second decision result corresponds to a soft floor, and
determine the floor type to be a hard floor in response to both the first decision result and the second decision result indicating a hard floor.

20. The robot cleaner according to claim 19, wherein the controller is further configured to:
increase the suction force of the suction module in response to the robot cleaner entering the soft floor from the hard floor, and
decrease the suction force of the suction module in response to the robot cleaner entering the hard floor from the soft floor.

21. A method for controlling a robot cleaner, the method comprising:
traveling using a wheel configured to move the robot cleaner and cleaning a floor using a brush module and a suction fan while traveling, in a cleaning traveling mode;
sensing a load applied to the wheel in the cleaning traveling mode and a load applied to the brush module; and
controlling suction force of the suction fan based on combining a first decision results based on the load applied to the wheel with a second decision result based on the load applied to the brush module.

22. The method according to claim 21, wherein:
the sensing a load applied to the wheel further comprises detecting rotations per minute (RPM) of a wheel motor configured to provide the wheel with drive power, and
the first decision result is based on the RPM of the wheel motor.

23. The method according to claim 22, wherein the first decision result corresponds to a hard floor in response to determining the RPM of the wheel motor is less than a reference value.

24. The method according to claim 22, wherein the first decision result corresponds to a soft floor in response to determining the RPM of the wheel motor is equal to or greater than a reference value.

25. The method according to claim 21, wherein the controlling suction force comprises determining a floor type to be a soft floor or a hard floor.

26. The method according to claim 25, wherein the first decision result comprises comparing the load applied to the wheel with a reference value.

27. The method according to claim 26, wherein the controlling suction force comprises:
determining the first decision result to be the soft floor in response to the load applied to the wheel being equal to or higher than the reference value, or
determining the first decision result to be the hard floor in response to the load applied to the wheel being less than the reference value.

28. The method according to claim 21, wherein the controlling suction force comprises:
increasing the suction force of the suction fan in response to the robot cleaner entering to a soft floor from a hard floor, or
decreasing the suction force of the suction fan in response to the robot cleaner entering the hard floor from the soft floor.

* * * * *